(12) United States Patent
Sampath et al.

(10) Patent No.: US 8,290,024 B2
(45) Date of Patent: Oct. 16, 2012

(54) METHODS AND APPARATUS TO FACILITATE IMPROVED CODE DIVISION MULTIPLE ACCESS RECEIVERS

(75) Inventors: Ashwin Sampath, San Diego, CA (US); Toshio Nagata, San Diego, CA (US)

(73) Assignee: Texas Instruments Incorporated, Dallas, TX (US)

( * ) Notice: Subject to any disclaimer, the term of this patent is extended or adjusted under 35 U.S.C. 154(b) by 1579 days.

(21) Appl. No.: 11/151,104

(22) Filed: Jun. 13, 2005

(65) Prior Publication Data

US 2006/0034352 A1 Feb. 16, 2006

Related U.S. Application Data

(60) Provisional application No. 60/601,375, filed on Aug. 12, 2004.

(51) Int. Cl.
*H04B 1/69* (2011.01)

(52) U.S. Cl. ........ 375/148; 375/229; 375/233; 375/267; 375/350; 375/347; 370/210; 370/335; 370/334; 370/341; 455/434; 455/296

(58) Field of Classification Search .................. 375/149, 375/228, 229, 232, 347, 259, 350, 233, 148, 375/267, 219, 260; 370/210, 335, 334, 341; 455/434, 296
See application file for complete search history.

(56) References Cited

U.S. PATENT DOCUMENTS

| | | | | |
|---|---|---|---|---|
| 6,075,808 A * | 6/2000 | Tsujimoto | | 375/143 |
| 6,944,244 B2 * | 9/2005 | Belotserkovsky et al. | | 375/350 |
| 7,151,573 B2 * | 12/2006 | Kim et al. | | 348/607 |
| 7,167,507 B2 * | 1/2007 | Mailaender et al. | | 375/148 |
| 7,184,473 B2 * | 2/2007 | Chen et al. | | 375/229 |
| 7,403,570 B2 * | 7/2008 | Ma et al. | | 375/260 |
| 7,433,398 B2 * | 10/2008 | Luo et al. | | 375/232 |
| 2004/0001426 A1 * | 1/2004 | Mailaender et al. | | 370/203 |
| 2004/0131011 A1 * | 7/2004 | Sandell et al. | | 370/210 |
| 2005/0129105 A1 * | 6/2005 | Papasakellariou | | 375/232 |
| 2006/0098726 A1 * | 5/2006 | Pan et al. | | 375/229 |

OTHER PUBLICATIONS

Wang et al., "Multipath Interference Cancellation Scheme for Multicode CDMA Systems in Multipath Fading Channels," *IEEE Wireless Communications and Networking Conference (WCNC)*, pp. 1817-1822, Mar. 2004.

Sengupta et al., "Design options for a 3G handset digital baseband system," *TI Technical Journal*, pp. 12-18, Oct.-Dec. 2000.

Hooli et al., "Performance Evaluation of Adaptive Chip-Level Channel Equalizers in WCDMA Downlink," *IEEE International Conference on Communications (ICC)*, pp. 1974-1979, Jun. 2001.

* cited by examiner

*Primary Examiner* — Eva Punte
(74) *Attorney, Agent, or Firm* — Ronald O. Neering; Wade James Brady, III; Frederick J. Telecky, Jr.

(57) ABSTRACT

Methods and apparatus to facilitate improve code division multiple access (CDMA) receivers are disclosed. An example method disclosed herein comprises: receiving a signal containing first portions that are based on known data and second portions that are based on unknown data; generating a training signal, from the received signal, that substantially represents one or more of the first portions; adapting filter coefficients using the training signal; and equalizing the received signal using the adapted filter coefficients.

15 Claims, 12 Drawing Sheets

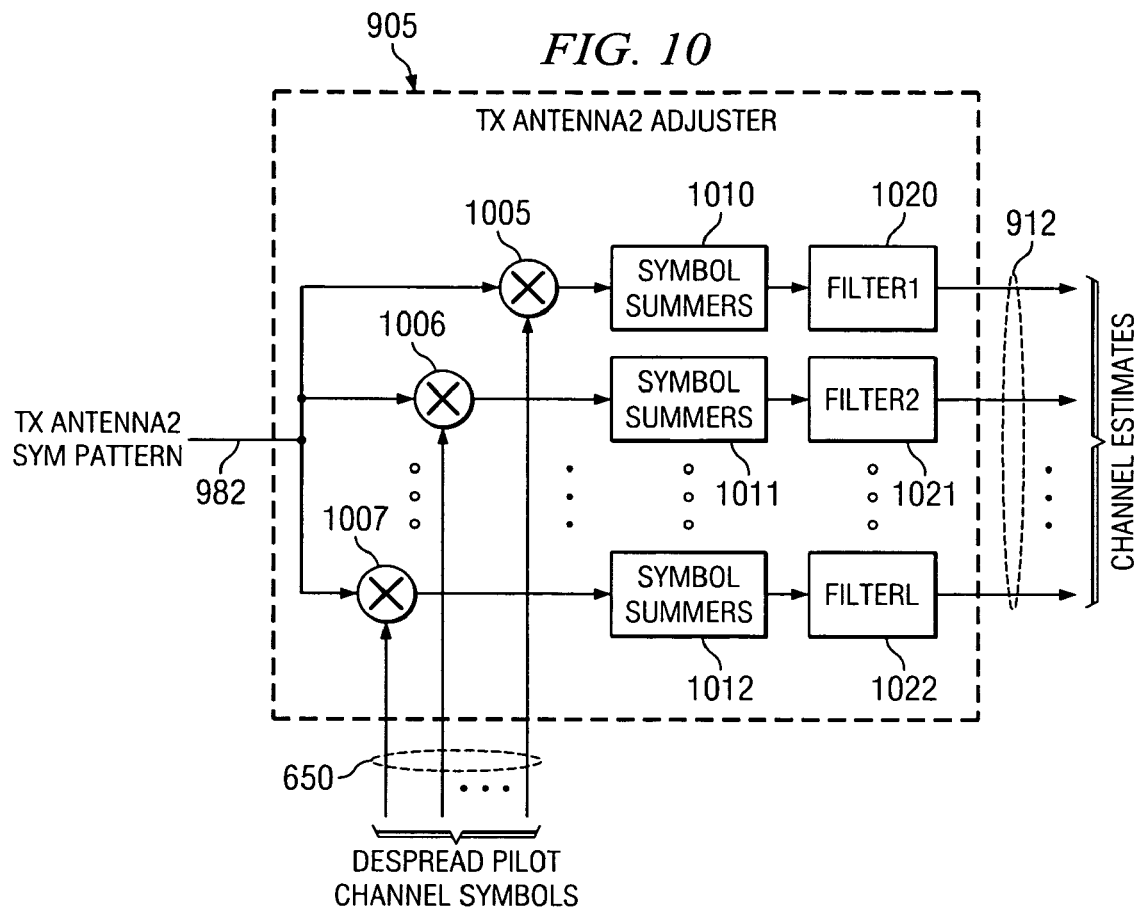
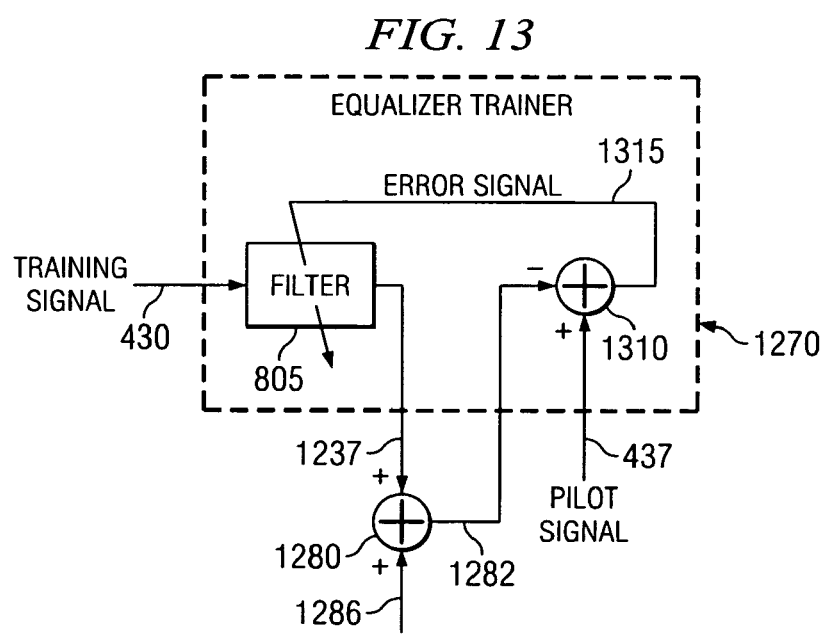

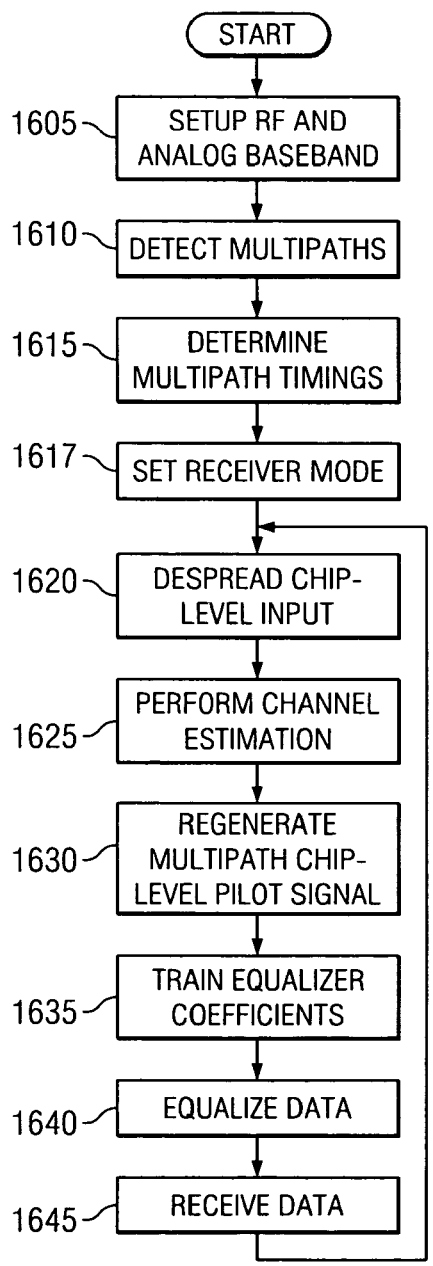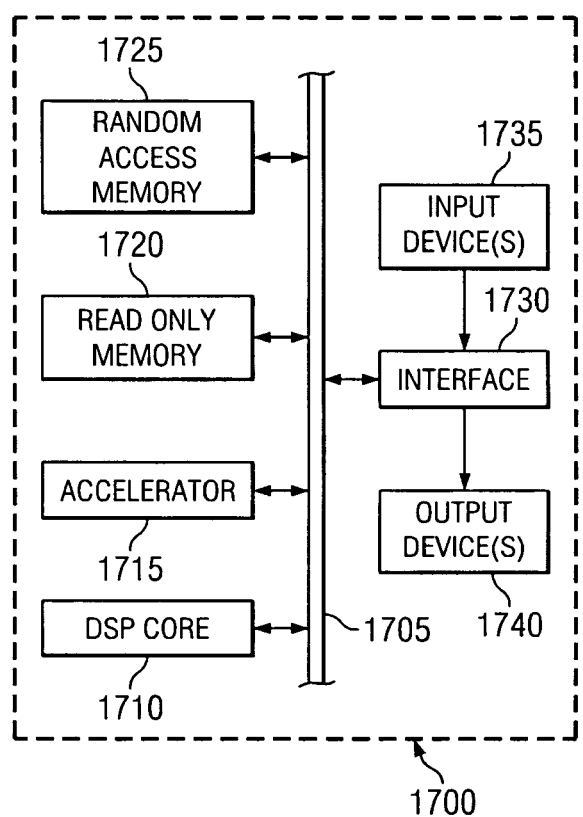

METHODS AND APPARATUS TO FACILITATE IMPROVED CODE DIVISION MULTIPLE ACCESS RECEIVERS

RELATED APPLICATION

This patent claims benefit of U.S. Provisional Application Ser. No. 60/601,375, entitled "Flexible Advanced Receiver for CDMA Systems" and filed on Aug. 12, 2004. U.S. Provisional Application Ser. No. 60/601,375 is hereby incorporated by reference in its entirety.

FIELD OF THE DISCLOSURE

This disclosure relates generally to receivers for wireless communication systems, and, more particularly, to methods and apparatus to facilitate improved code division multiple access (CDMA) receivers.

BACKGROUND

Third generation (3G) mobile radio standards (e.g., CDMA2000, Universal Mobile Telecommunications Systems (UMTS)) for wireless communication systems are the result of a massive worldwide effort involving many companies since the mid-1990s. 3G standards initially supported data rates up to 2 megabits per second (Mbps) but have evolved to support data rates up to 14 Mbps.

FIG. 1 is a diagram of an example prior-art wireless communication system 100 consisting of a wireless base station 110 and a plurality of wireless mobile devices (e.g., a wireless handset 115, a laptop computer 116, a personal digital assistant (PDA) 117, etc.) with which the wireless base station 110 is capable of communicating data and/or voice information.

FIG. 2 is a block diagram illustration of an example prior-art manner of implementing the wireless handset 115 of FIG. 1. The wireless handset 115 contains an antenna 210 used to transmit and receive wireless radio frequency (RF) signals to and from the wireless base station 110 (not shown). To process the RF signals received from the wireless base station 110 via the antenna 210, and to generate RF signals for transmission to the wireless base station 110 via the antenna 210, the example wireless handset 115 contains a RF transceiver 215. The RF transceiver 215 modulates baseband transmit signals received from the analog baseband processor 220 to RF band signals, and demodulates RF band signals received from the RF transceiver 215 to baseband.

To handle conversion from the analog domain to the digital domain, the example wireless handset 115 further includes an analog baseband processor 220. The analog baseband processor 220 comprises an analog-to-digital (A/D) converter (not shown) to transform analog baseband signals received from the RF transceiver 215 into digital baseband signals for the digital baseband processor 225. The analog baseband processor 220 also includes a digital-to-analog (D/A) converter (not shown) to transform digital baseband signals received from the digital baseband processor 225 into analog baseband signals for the RF transceiver 215.

To implement the digital receive functions (e.g., equalization, despreading, demodulation, etc.) and the digital transmit functions (e.g., modulation, spreading, etc.) the example wireless handset 115 includes the digital baseband processor 225. To encode and decode signals representative of speech, the example wireless handset 1 5 further includes a voice-coder-decoder (vocoder) 230. The vocoder 230 comprises a speech encoder (not shown) to translate digital samples representing speech spoken by the user (not shown) of the wireless handset 115 into a stream of digital data to be processed for transmission to the wireless base station 110 by the digital baseband processor 225, the analog baseband processor 220, the RF transceiver 215, and the antenna 210. Likewise, the vocoder 230 comprises a speech decoder (not shown) to translate a stream of digital data received from the wireless base station 110 into digital samples representative of speech to be listened to by the user of the wireless handset 115.

The example wireless handset 115 further comprises a voice transceiver 235 that implements conversion of analog signals representative of speech received from a microphone 245 into digital samples using, among other things, an A/D converter (not shown). The voice transceiver 235 further implements conversion of digital samples representative of speech received from the vocoder 230 to analog signals which can be played out a speaker 240 using, among other things, a D/A converter (not shown).

Example implementations of the antenna 210, the RF transceiver 215, the analog baseband processor 220, the vocoder 230, the voice transceiver 235, the speaker 240, and the microphone 245 are well known to persons of ordinary skill in the art, and, thus, will not be discussed further.

Asymmetric user services (e.g., web browsing) requiring high downlink capacity (i.e., from wireless base station to the wireless mobile device) led to the development of the High Speed Downlink Packet Access (HSDPA) and the Evolution Data and Voice (EV-DV)/Evolution Data Optimized (EV-DO) standards. Efficient downlink wireless receivers that can operate in the presence of multiple transmission paths are important to achieving high downlink capacity. In subsequent discussions the term multipaths refers collectively to a plurality of transmission paths by which a signal transmitted by one device is received by a second device. In such circumstances, a receiver receives the transmitted signal a number of times wherein each received version of the transmitted signal has a different time delay, signal attenuation, and phase relative to the other received versions. Multipaths are created by reflections of the wireless signal off of objects located near the transmitter, the receiver, or in between. For example, buildings, bridges, cars, clouds, etc. Further, the term multipath refers to one of the plurality of transmission paths between the first device and the second device (i.e., one of the paths comprising the multipaths).

It is widely recognized that the well-known, conventional RAKE receiver suffers significant degradation in performance in the presence of multipaths on the downlink of a wireless communication system. In 3G standards, code transmissions on the downlink are typically designed to be orthogonal at a transmitter, but multipaths destroy the orthogonality resulting in significant inter-code interference at a wireless receiver. In the context of 3G, orthogonality refers to the use of spreading sequences that are orthogonal to each other, i.e., there is no correlation between a first spreading sequence and a second spreading sequence. The lower the CDMA spreading factor being utilized and the closer a user is located to the wireless base station 110, the more deleterious the effect of interference due to multipaths becomes. High speed data wireless systems such as EV-DV/EV-DO and HSDPA for UMTS employ a low spreading factor and may utilize a scheduling rule that tends to select users that are close to the wireless base station 110. The RAKE receiver does little to mitigate the effects of the multipath interference, therefore, the effects of multipath interference on these wireless mobile devices is quite significant.

Wireless receivers that try to mitigate the multipath interference in some fashion are termed advanced receivers. Two broad classes of CDMA advanced wireless receivers are equalizers and interference cancellers. If a received chip level signal, which has been distorted by multipaths, is sufficiently equalized prior to correlation with a spreading code, there is only a single path present during a subsequent despreading operation. A chip represents a time duration of a CDMA signal corresponding to one value in a pseudo-noise (PN) code sequence used to spread/de-spread the CDMA signal. Assuming orthogonal spreading sequences, an equalizer can largely restore orthogonality of multiple codes that started out orthogonal at the transmitter even in the presence of multiple transmission paths. Implementing equalization of chip level signals, rather than symbol level signals, allows the application of equalization to wireless communication systems utilizing long spreading sequences.

A downlink of a CDMA system typically uses a broadcast common pilot channel (CPICH) to transmit CPICH symbols that are known a priori to the wireless mobile device. The CPICH is used by a receiver in a wireless mobile device for synchronization, channel estimation, handoff support, etc. Additionally, in the case of an equalizer, the CPICH symbols may be used to train an equalizer. Frequently the normalized least mean squares (NLMS) algorithm is used to adapt equalizer coefficients. For simplicity, we shall refer to such CPICH trained NLMS equalizers as "CPICH based NLMS".

FIG. 3 is a block diagram illustration of an example prior-art manner of implementing the digital baseband processor 225 of FIG. 2. The digital baseband processor 225 generally includes a transmitter 310 and a receiver 315. To convert digital data representative of encoded speech received from the vocoder 230 into CDMA transmit signals, the transmitter 310 includes a channel encoder 320, a modulator 322, and a spreader 325. The channel encoder 320 includes, among other things, the following functions: channel encoding, cyclic redundancy check (CRC) generation, conversion to blocks of data, rate matching, interleaving, multiplexing, etc. The modulator 322 modulates (e.g., using QPSK, QAM, etc.) the output of the channel encoder 320 which is then multiplied with a PN code sequence by the spreader 325 to create a digital CDMA transmit signal. The PN code sequence is formed as an exclusive-or of a cell specific PN code sequence and a channel specific PN code sequence.

To help mitigate the effects of multipath interference, the example receiver 315 includes an equalizer 328 to apply a filter to an input chip level signal 326. As discussed above, the equalizer 328 works to restore orthogonality of signals being received by the receiver 315. Filter coefficients of the equalizer 328 are adapted using an error signal 331 formed as a difference between a spread pilot signal 332 and an output 329 of the equalizer. The spread pilot signal 332 is formed by multiplication of CPICH symbols and a first PN code sequence. The CPICH symbols are those transmitted by the wireless base station 10 on the CPICH. The first PN code sequence is an exclusive-or of the cell specific PN code sequence and a CPICH specific code sequence. Because the duration of each CPICH symbol is multiple (e.g., 256) chips, the multiplication of the CPICH symbols and the first PN code sequence multiplies each CPICH symbol by N chips of the first PN code sequence, where N is the duration of each CPICH symbol.

If the equalizer 328 adapts its filter coefficients using NLMS, then the equalizer update configuration shown in FIG. 3 (comprising the equalizer 328, the equalizer output 329, the spread pilot signal 332, and the error 331) is the conventional, prior-art "CPICH based NLMS." In a conventional "CPICH based NLMS" chip level equalizer, the input chip level signal 326 used in equalizer training comprises not only multipath signals of the CPICH, but also signals from one or more other downlink channels. At a chip level these signals are all roughly the same power, thus, the variance of the error signal 331 used in equalizer training will be quite large. Such a large variance limits the achievable performance of the equalizer 328.

Because each CDMA transmit signal has been spread by multiplication with a second PN code sequence (formed as an exclusive-or of the cell specific PN code sequence and the data channel specific code sequence) in the wireless base station 110, the receiver 315 includes a despreader 330 that correlates the equalized received signal 329 with the second PN code sequence. This second PN code sequence is the same PN code sequence used in the wireless base station 10 to spread data symbols currently being received. Outputs of the correlation process are provided every spreading factor (SF) chips. If adequate equalization is not performed in the presence of multipaths, every significant multipath must be individually despread by the despreader 330.

The outputs of the despreader 330 are passed through a demodulator 335 before being passed to a channel decoder 340 that performs, among other things: de-multiplexing, de-interleaving, rate detection and de-rate matching, conversion from blocks, CRC checking, channel decoding, etc.

Example implementations of the channel encoder 320, the modulator 322, the spreader 325, the equalizer 328, the despreader 330, the demodulator 335, and the channel decoder 340 are well known to persons of ordinary skill in the art, and, thus, will not be discussed further.

BRIEF DESCRIPTION OF THE DRAWINGS

FIG. 10 is a block diagram illustration of a disclosed example manner of implementing the TX Antenna2 Adjuster of FIG. 9.

FIG. 13 is a block diagram illustration of a disclosed example manner of implementing the equalizer trainers of FIG. 12.

FIG. 16 a flow chart illustrating a disclosed example process that may be executed by the digital baseband receiver of FIG. 4.

FIG. 17 is a block diagram illustration of a disclosed example digital signal processor that may execute the process of FIG. 16 to implement the digital baseband receiver of FIG. 4.

DETAILED DESCRIPTION

Figure 1:
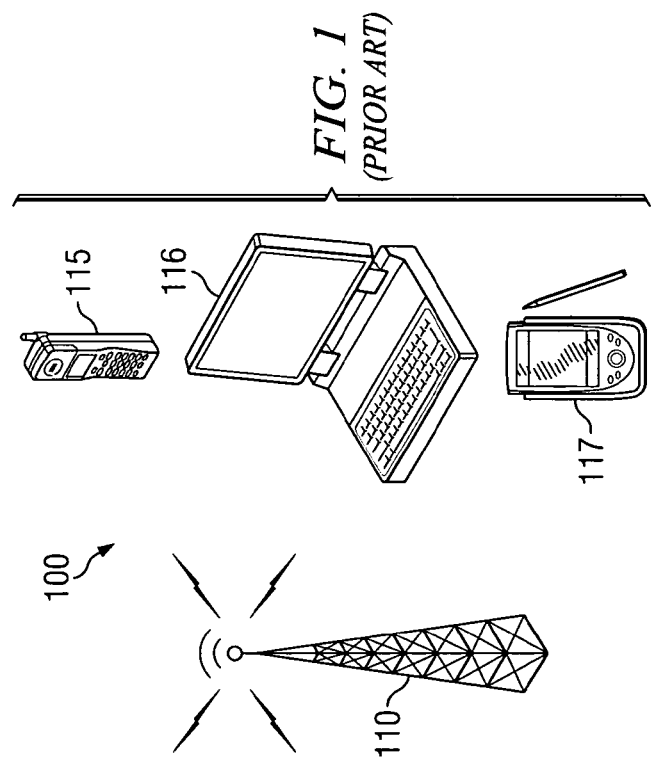
FIG. 1 is a diagram of an example prior-art wireless communication system with a wireless base station and a plurality of wireless mobile devices.
Figure 2:
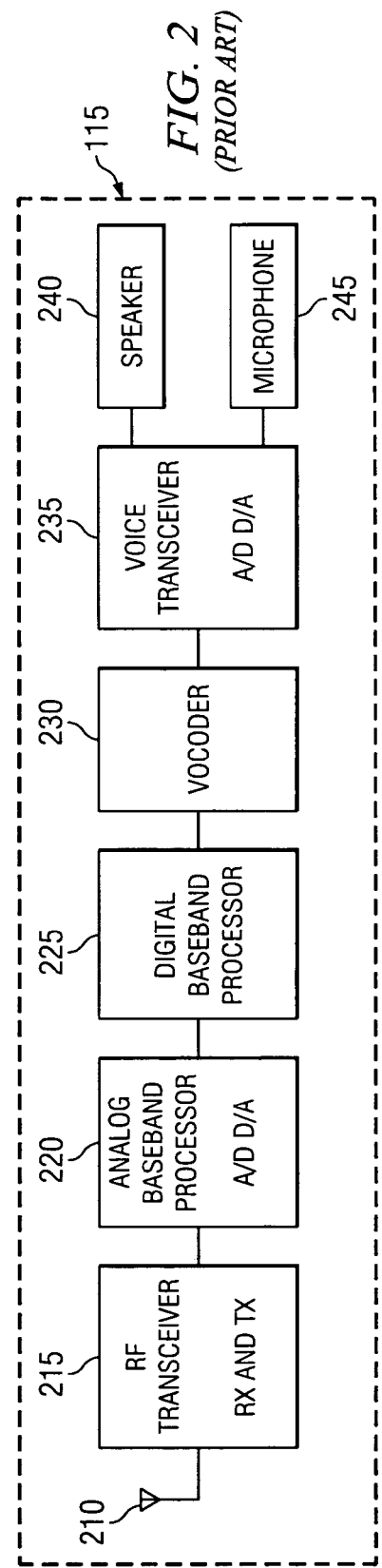
FIG. 2 is a block diagram illustration of an example prior-art manner of implementing the wireless handset of FIG. 1.
Figure 3:
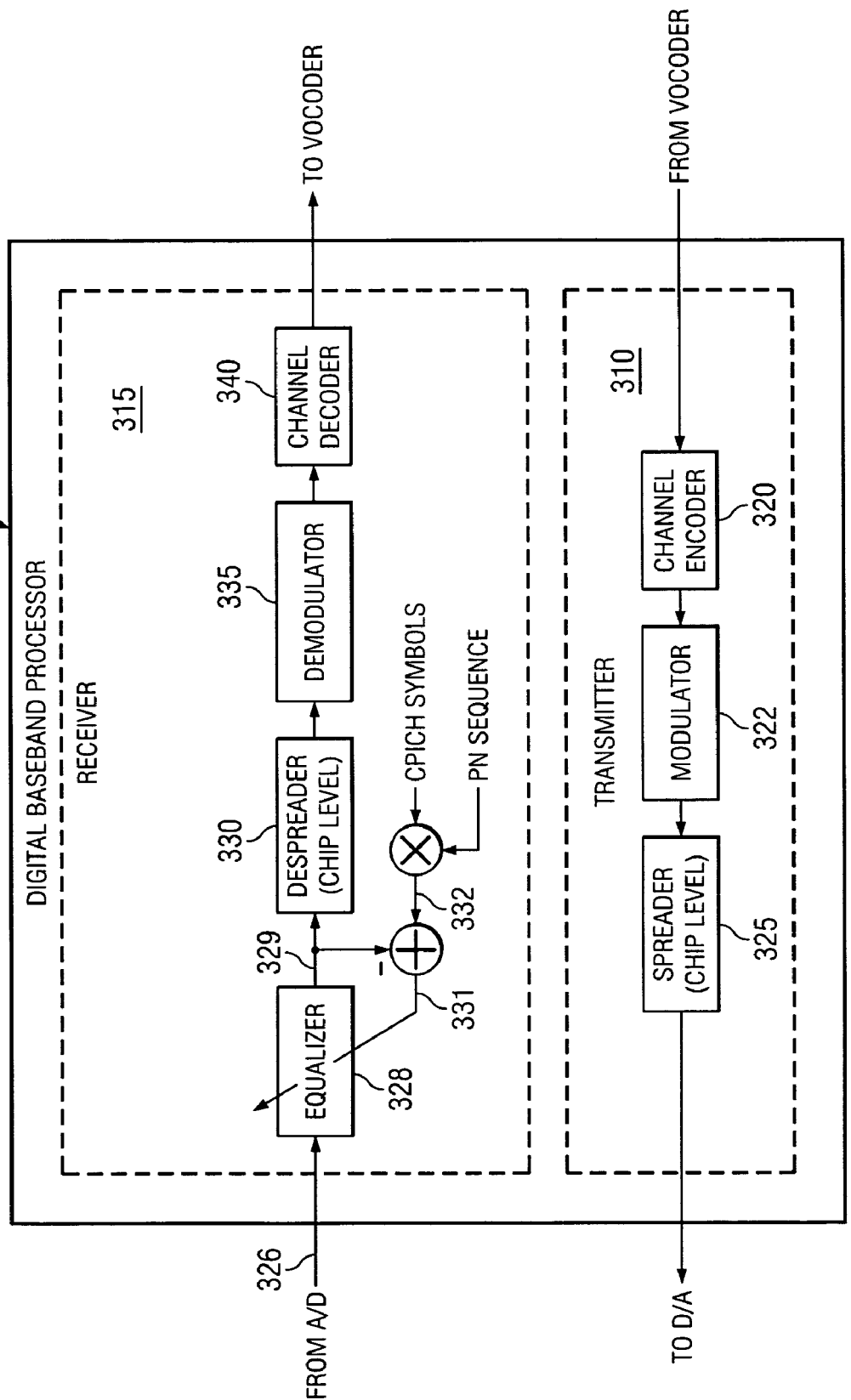
FIG. 3 is a block diagram illustration of an example prior-art manner of implementing the digital baseband processor of FIG. 2.
Figure 4:
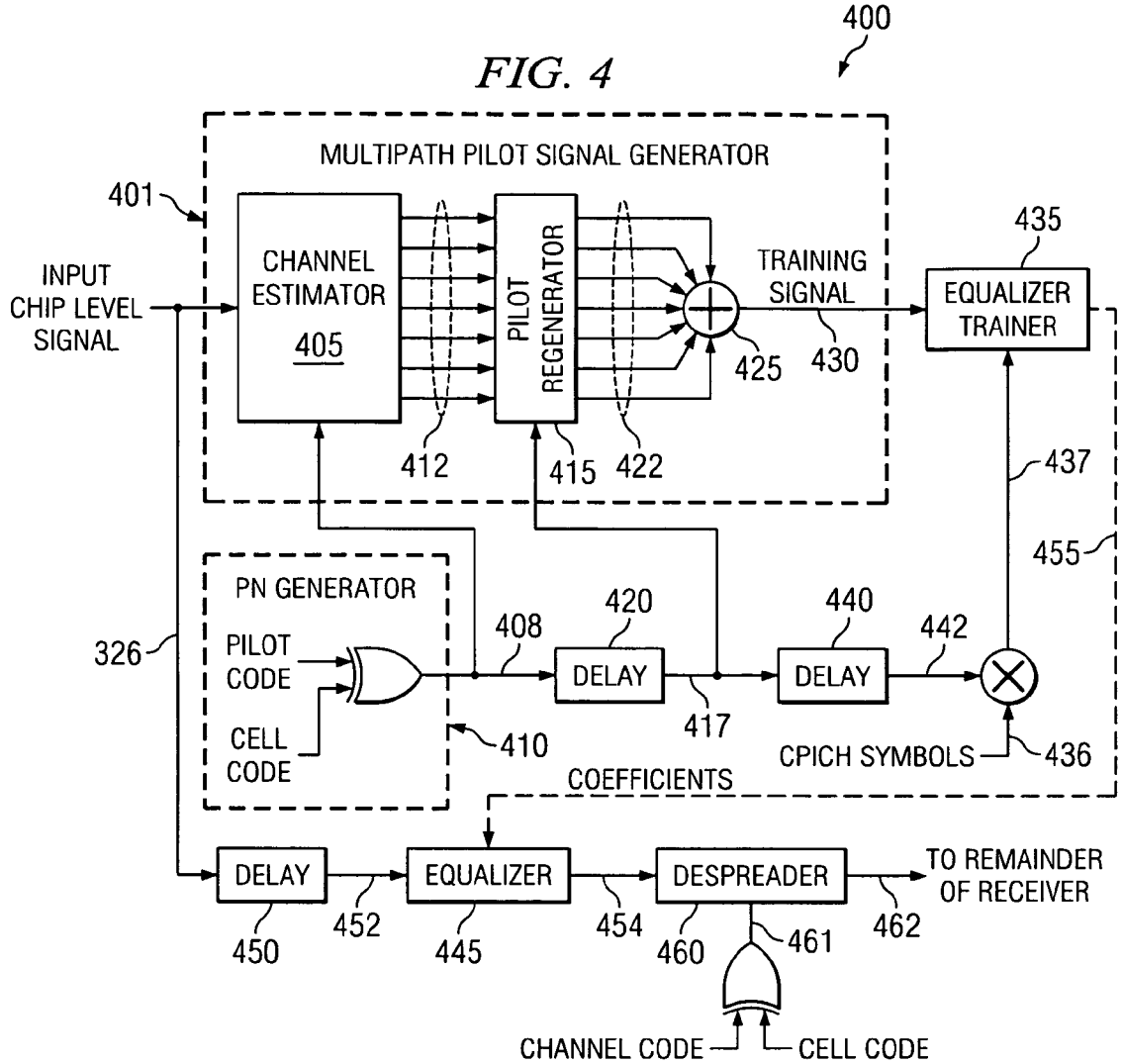
FIG. 4 is a block diagram illustration of a portion of a disclosed example digital baseband receiver.

A conventional CPICH based chip-level NLMS equalizer directly applies time domain techniques from narrow band systems (e.g., GSM) that, while often better than a RAKE receiver for low data rates, are less effective in high data rate CDMA systems since, by design, CDMA signals have low signal to noise ratio (SNR) characteristics at the chip level. FIG. 4 is a block diagram illustrating a portion of a disclosed example digital baseband receiver 400. In a CDMA system, the input chip level signal 326 is comprised of signals associated with a number of downlink channels (interferers), multipaths, and additive channel noise. Taking advantage of the interference suppression capabilities of CDMA spreading sequences, the illustrated example includes a multipath pilot signal generator 401 to generate an equalizer training signal 430 (from the input chip level signal 326) substantially representative of CPICH symbols that have been spread and then received through multiple transmission paths (i.e., a multipath pilot signal). Interferers (e.g., other control and data channels) and additive channel noise present in the training signal 430 are substantially reduced compared to the input chip level signal 326. Thus, the training signal 430 has a substantially improved SNR compared to the input chip level signal 326 such that, an equalizer whose coefficients are adapted using the training signal 430 performs substantially better than a conventional prior-art CPICH based NLMS equalizer.

The equalizer training signal 430 is generated by the multipath pilot signal generator 401 by (a) determining channel estimates 412 from the input chip level signal 326, (b) re-spreading the channel estimates 412 to form spread channel estimates 422, and (c) combining the spread channel estimates 422 using a summer 425. To determine the channel estimates 412, the multipath pilot signal generator 401 includes a channel estimator 405 which despreads (using a PN code sequence 408 generated by a PN generator 410), accumulates, and filters the input chip level signal 326 to extract received pilot channel symbols (for each multipath). As will be discussed below in conjunction with FIG. 6, the despreading process implemented in the channel estimator 405 accounts for the timings of each multipath. Further, long enough accumulations are used to properly balance multipath interference against channel tracking performance.

The PN generator 410 forms the PN code sequence 408 as an exclusive-or of the CPICH specific code sequence and the cell specific PN code sequence. For UMTS the CPICH specific code sequence is the all zeros sequence (for the primary CPICH), and, thus, can be ignored and the exclusive-or can be eliminated.

To spread the channel estimates 412, the multipath pilot signal generator 401 provides a pilot regenerator 415 to multiply (using correct timings for each multipath) each of the channel estimates 412 by a delayed PN code sequence 417. The receiver 400 provides a delay 420 to delay the PN code sequence 408 by an amount corresponding to filtering delays in the channel estimator 405 to create the delayed PN code sequence 417. The multipath pilot signal generator 401 further provides a summer 425 to add together each of the re-spread channel estimates 422 to form the equalizer training signal 430.

To determine equalizer coefficients (to restore orthogonality of received signals), the example digital baseband receiver 400 of FIG. 4 includes an equalizer trainer 435. The equalizer trainer 435 applies a filter (whose coefficients are substantially equivalent to coefficients 455 of an equalizer 445) to the training signal 430 (i.e., the multipath pilot signal) to form an equalized multipath pilot signal. The equalizer trainer 435 adapts the coefficients of the filter to minimize an error between the equalized multipath pilot signal and a locally generated pilot training signal 437. The locally generated pilot signal 437 is formed by multiplying CPICH symbols 436 by a further delayed PN code sequence 442. The further delayed PN code sequence 442 is formed by further delaying the delayed PN code sequence 417, using a delay 440, where the amount of delay implemented by the delay 440 corresponds to the centering delay of the multipath channels. Since the duration of each CPICH symbol 436 is multiple (e.g., 256) chips, the multiplication of CPICH symbols 436 and the further delayed PN code sequence 442 multiplies each CPICH symbol 436 by N chips of the further delayed PN code sequence 442, where N is the duration of each CPICH symbol 436. For UMTS the CPICH symbols 436 are all identical, however, because the CPICH symbol is complex-valued the multiplication can not be eliminated.

Under the assumptions that CPICH symbols 436 are identical, the training signal 430 substantially comprises a summation of the channel estimate 412 for each multipath spread by the PN code sequence 408; and scaled and rotated by the CPICH symbol 436. Further, the locally generated pilot signal 437 comprises the PN code sequence 408 scaled and rotated by the CPICH symbol 436. As constructed, the training signal 430 and the locally generated pilot signal 437 substantially only differ in whether or not they include the channel estimates 412. Thus, the equalizer trainer 435 properly adapts coefficients to equalize the multipath channel responses. If, the CPICH symbols 436 are not identical, then the training signal 430 substantially comprises a summation of CPICH symbols 436 convolved with the channel estimate 412 for each multipath further spread by the PN code sequence 408. Because the locally generated pilot signal 437 includes the multiplication with CPICH symbols 436, the equalizer trainer 435 will properly adapt coefficients to equalize the multipath channel responses.

In the illustrated example, the filter of the equalizer trainer 435 is a finite impulse response (FIR) filter. Further, the adaptation of the coefficients uses NLMS. Filters (e.g., FIR) and filter coefficient adaptation (e.g., NLMS) are well known to persons of ordinary skill in the art, and, in the interest of brevity, are not discussed further. Persons of ordinary skill in the art will readily appreciate that the filter could be implemented using some other suitable filter structure or filtering arrangement; and/or other forms of coefficient adaptation (e.g., least mean squares (LMS), recursive least squares (RLS), etc.) could be implemented.

To receive the user data present in the input chip level signal 326, the digital baseband receiver 400 further comprises a delay 450 and a despreader 460. The delay 450 delays the input chip level signal 326 by an amount corresponding to any filtering delays present in the channel estimator 405 creating a delayed input chip level signal 452. To equalize the delayed input chip level signal 452 the equalizer 445 applies a filter to the delayed input chip level signal 452 creating an equalized received signal 454. In the illustrated example, the filter of the equalizer 445 is an FIR filter. However, persons of ordinary skill in the art will readily appreciate that the filter could utilize other suitable filter structures or filtering arrangements. In the illustrated example the structure of the filter of the equalizer trainer 435 is the same as the structure of the filter of the equalizer 445; and the coefficients 455 of the filter of the equalizer 445 are substantially equal to the coefficients of the filter of the equalizer trainer 435. However, it should be appreciated by persons of ordinary skill in the art that the two filters could utilize different filter structures and filter coefficients as long as they realize substantially equivalent transfer functions.

To despread the equalized received data signal 454, the despreader 460 multiplies the equalized received signal 454 with a second PN code sequence that is an exclusive-or of the cell specific PN code sequence and a data channel specific code sequence. Finally, further receive processing (not shown) of the output 462 of the despreader 460 is performed. For example, in the case of HSDPA channels, the output 462 of the despreader 460 is processed to extract symbols corresponding to the HSDPA channels and is followed by the calculation of log likelihood ratios that characterize the reliability of those symbols. Typically, hybrid-ARQ combining and turbo decoding are performed next to recover transmitted information bits corresponding to user data.

In the illustrated example just discussed, a precise multipath profile (e.g., multipath timings, signal strengths, etc.) is utilized. Alternatively, to despread the input chip level signal 326 several contiguous chip spaced paths (regardless of whether any signal energy exists on some of them or not) may be used.

Figure 5:
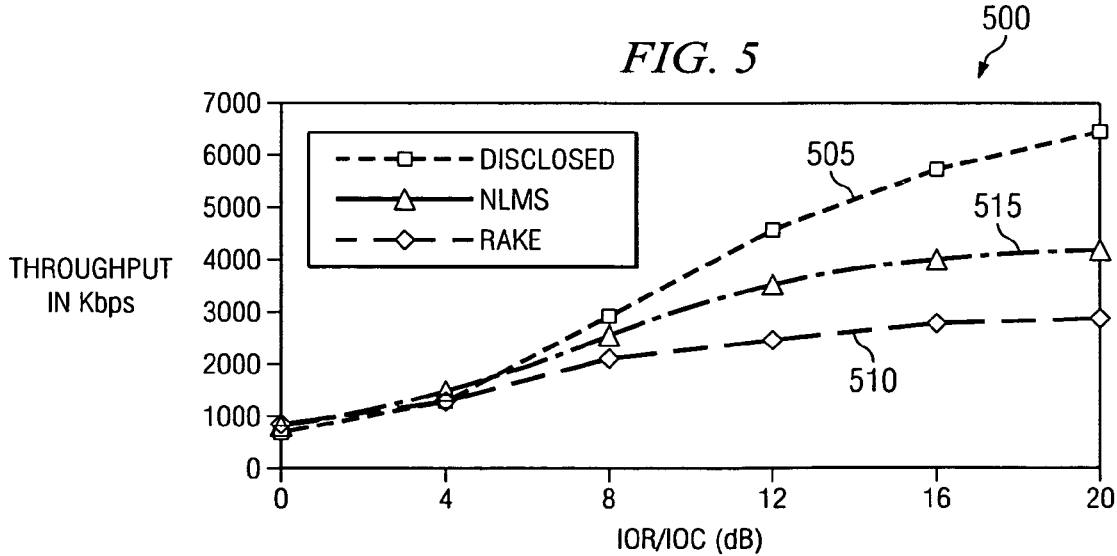
FIG. 5 is a graph illustrating data throughput improvements of the example digital baseband receiver of FIG. 4.

FIG. 5 shows a graph 500 showing exemplary data throughput improvements in Kbps resulting from the illustrated example digital baseband receiver 400 of FIG. 4. FIG. 5 illustrates the performance, for a variety of channel signal to noise conditions (represented by IOR/IOC as recorded in decibels (dB)), of (a) the example digital baseband receiver 400 of FIG. 4 using line 505, (b) a conventional RAKE receiver using line 510, and (c) a CPICH based NLMS receiver using line 515, where IOR is the total received signal power from the serving wireless base station and IOC is the total inteference power from all other (i.e., non-serving) wireless base stations. The ratio IOR/IOC reflects the geometry of the signal and roughly equates to the SNR of the signal. For a low IOR/IOC ratio, the SNR of training signals is often better than the SNR of data carrying signals. This causes a condition where equalizer coefficients adapted during training may be sub-optimal for data reception. Thus, for low IOR/IOC ratio conditions a RAKE receiver may perform better than either the example digital baseband receiver 400 of FIG. 4 or a CPICH based NLMS receiver. However, a simple adaptation loop that makes the adaptation step-size dependent on the SNR could be used. For example, at low SNR with the CPICH based NLMS or the example digital baseband receiver 400 of FIG. 4, a smaller adaptation step-size (compared to high SNR) could be used, thus, providing better noise suppression and improved performance at the expense of adaptation speed. An example multi-mode solution, as discussed below in connection with FIG. 14, allows the use of either a RAKE receiver or the example digital baseband receiver 400 of FIG. 4, thus, achieving the best performance regardless of SNR.

Figure 6:
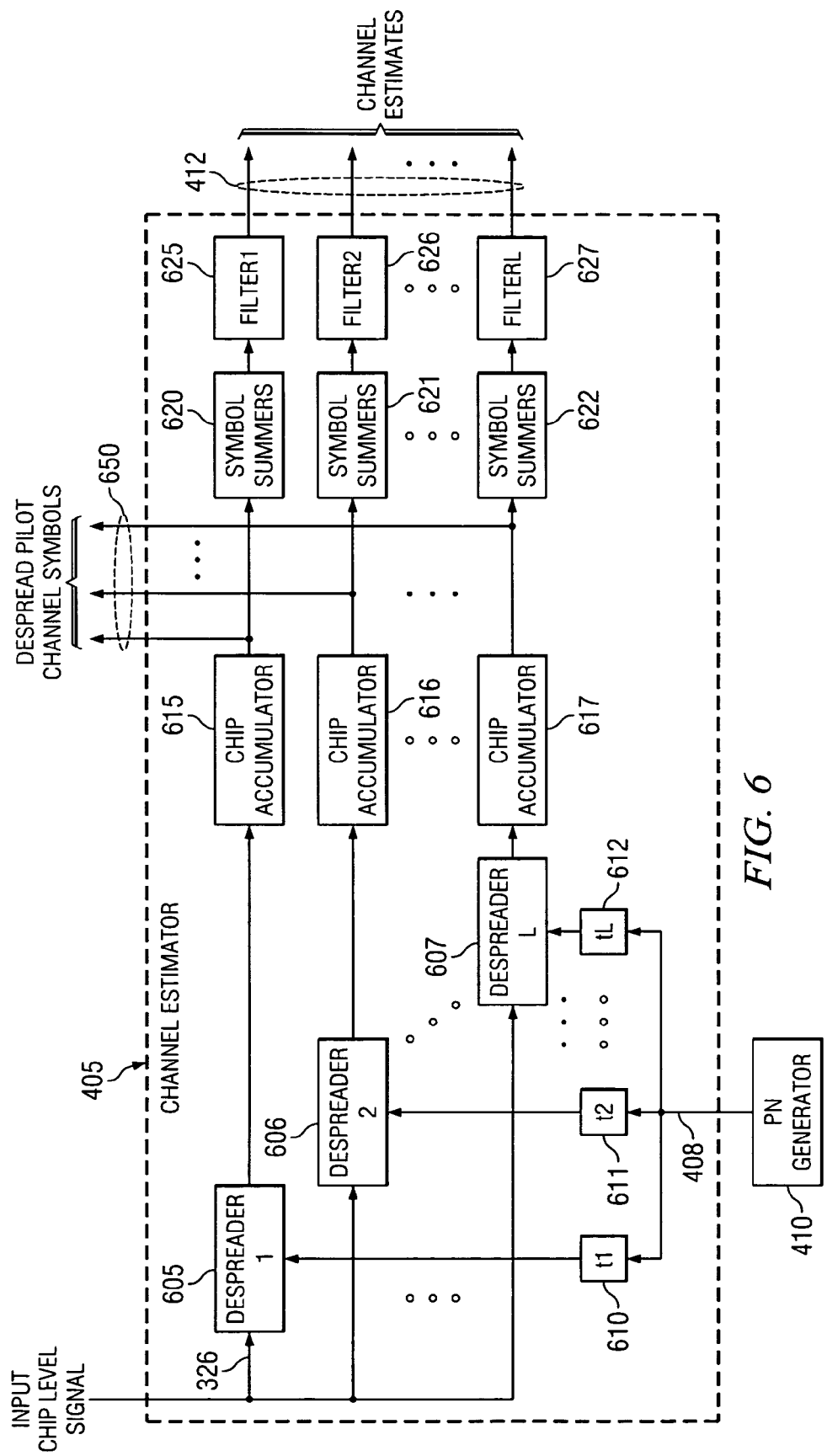
FIG. 6 is a block diagram illustration of a disclosed example manner of implementing the channel estimator of FIG. 4.

FIG. 6 is an illustration of a disclosed example manner of implementing the channel estimator 405 of FIG. 4. To despread the input chip level signal 326 and to eliminate interference from non-pilot channels (e.g., other, undesired, downlink channels) into each multipath and to suppress interference from other multipaths, the channel estimator 405 provides a plurality of despreaders 605, 606, and 607. A despreader 605, 606, and 607 is provided for each of one or more multipaths present in the input chip level signal 326. The despreaders 605, 606, and 607 despread the input chip level signal 326 by multiplication of the input chip level signal 326 with a delayed PN code sequence specific to each multipath. To form the delayed cell specific PN code sequences for each multipath, the channel estimator 405 further provides a plurality of delay elements 610, 611, and 612. The delay elements 610, 611, and 612 delay the PN code sequence 408 by an amount substantially corresponding to the multipath timing for each multipath. The detection of multipaths and the adaptation of their timings are well known to persons of ordinary skill in the art, and, thus, will not be discussed further.

To extract received symbols, the example channel estimator 405 of FIG. 6 includes a plurality of chip accumulators 615, 616, and 617. The chip accumulators 615, 616, and 617 perform an accumulation over a number (e.g., 256) of chips to extract despread pilot channel symbols 650 (i.e., received symbols). The despread pilot channel symbols 650 for each multipath will substantially comprise transmitted CPICH symbols 436 convolved with a channel response for the multipath. If the transmitted CPICH symbols are identical, the despread pilot channel symbols 650 substantially comprise channel responses of each multipath scale and rotated by the CPICH symbol 436. In the illustrated example, the summation is performed over 256 chips.

When the wireless base station 110 is using two-antenna transmit diversity in UMTS, then first CPICH symbols transmitted by a first transmit antenna are orthogonal to second CPICH symbols transmitted by a second antenna only when descrambled and summed over 512 chips. If transmit diversity is used, then in the illustrated example after despreading and summing over 256 chips accumulation of the despread pilot symbol signals 650 over two symbols is performed. Thus, effectively implementing despreading over 512 chips. If transmit diversity is not used by the wireless base station, then accumulation over 2 symbols need not be performed. To implement the accumulation over 2 symbols, the channel estimator 405 comprises a plurality of symbol summers 620, 621, and 622. In the illustrated example, the symbol summers 620, 621, and 622 only operate when transmit diversity is used by the wireless base station 110. Alternatively, for simplicity in the architecture, the symbol summers 620, 621, and 622 are active regardless of whether or not the wireless base station is using transmit diversity. It should be readily apparent to persons of ordinary skill in the art that the number of chips accumulated by the chip accumulators 615, 616, and 617 and the number of symbols summed by the symbols summers 620, 621, and 622 can be modified from the illustrated example as long as the chosen values ensure orthogonality of the first and second CPICH symbols transmitted by the two transmit antennas.

To obtain reliable channel estimates 412 for each multipath the channel estimator 405 further comprises a plurality of filters 625, 626, and 627. In the illustrated example, the plurality of filters 625, 626, and 627 are implemented as infinite impulse response (IIR) filters and provide a low-pass filtering (LPF) transfer function. The LPF transfer function serves to reduce out-of-band noise and to help smooth the channel estimates. It should be readily apparent to persons of ordinary skill in the art that the filters 625, 626, and 627 could utilize FIR filters or other suitable filter structures or filtering arrangements.

Figure 7:
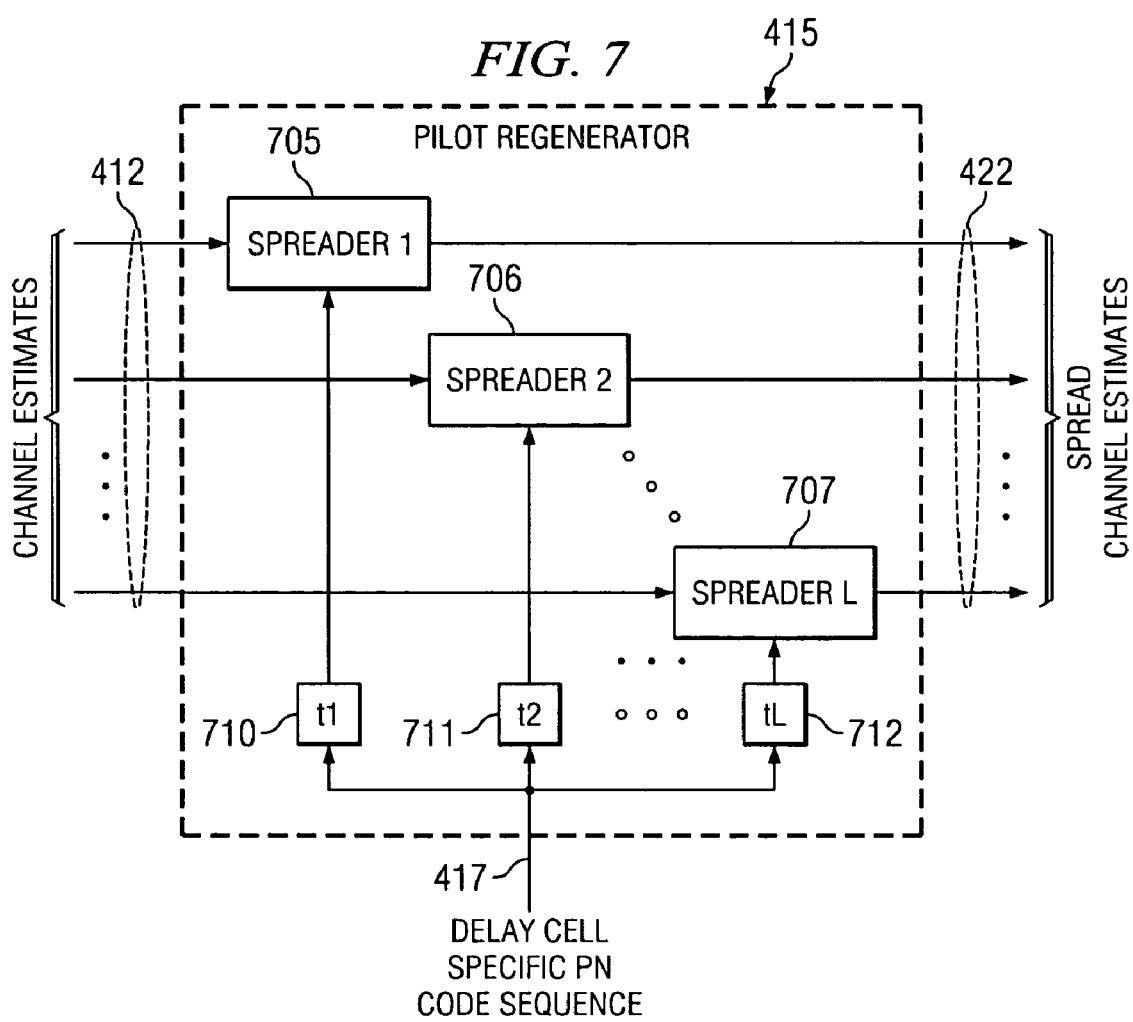
FIG. 7 is a block diagram illustration of a disclosed example manner of implementing the pilot regenerator of FIG. 4.

FIG. 7 is an illustration of a disclosed example manner of implementing the pilot regenerator 415 of FIG. 4. So that the multipath pilot signal 430 can be generated (by the summer 425), the pilot regenerator 415 comprises a plurality of spreaders 705, 706, and 707. A spreader 705, 706, and 707 is provided for each of one or more multipaths present in the input chip level signal 326. The spreaders 705, 706, and 707 spread each of the channel estimates 412 (as provided by the channel estimator 405) by multiplication of each channel estimate 412 with a delayed PN code sequence specific to each multipath. To form the delayed PN code sequences, the pilot regenerator 415 further provides a plurality of delay elements 710, 711 and 712. The delay elements 710, 711 and 712 further delay the delayed PN code sequence 417 by an amount substantially corresponding to the multipath timing for each multipath.

Figure 8:
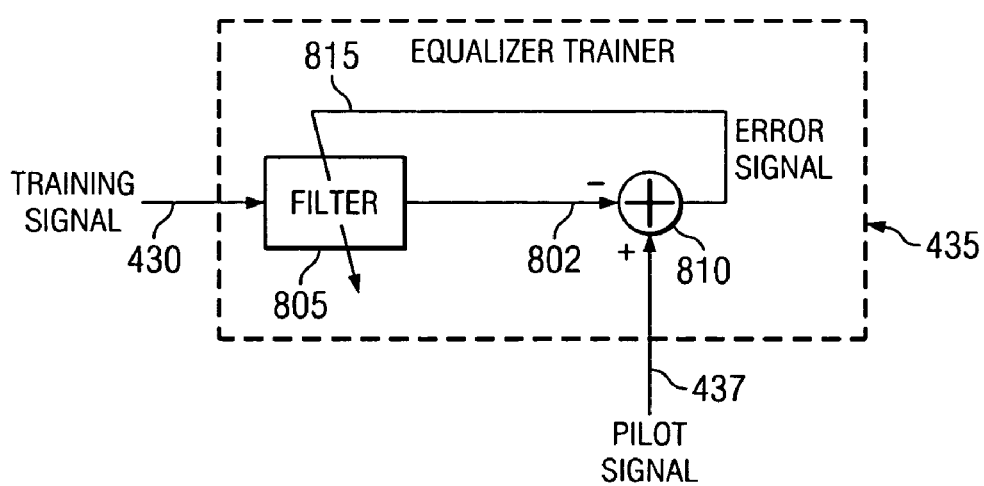
FIG. 8 is a block diagram illustration of a disclosed example manner of implementing the equalizer trainer of FIG. 4.

FIG. 8 is an illustration of a disclosed example manner of implementing the equalizer trainer 435 of FIG. 4. To create a signal 802 which substantially matches the locally generated pilot signal 437, the equalizer trainer 435 provides a filter 805. To form an error signal 815 useful for adapting coefficients of the filter 805, the equalizer trainer 435 further provides a summer 810. The summer 810 computes the error signal 815 as a difference between (a) the locally generated pilot signal 437 and (b) the output 802 of the filter 805. Further, the filter 805 is an FIR filter and adaptation of the coefficients of the filter 805 uses NLMS. However, persons of ordinary skill in the art will readily appreciate that the filter 805 could utilize other suitable filter structures or filtering arrangements; and/or other forms of coefficient adaptation (e.g., LMS, RLS, etc.) could be implemented.

In the illustrated example the structure of the filter 805 is the same as the structure of the filter of the equalizer 445; and the coefficients of the filter of the equalizer 445 are substantially equal to the coefficients of the filter 805. However, it should be appreciated by persons of ordinary skill in the art that the two filters could utilize different filter structures and filter coefficients as long as they realize substantially equivalent transfer functions.

Persons of ordinary skill in the art will readily appreciate that any known downlink channel (i.e., a channel for which the wireless receiver 315 knows a priori the transmitted symbols) could be used instead of the CPICH. Further, if two or more known downlink channels (possibly including the CPICH) were available, training signal 430 and signal 437 could be generated to represent the known data from the known downlink channels. For example, if two known downlink channels using different channel PN code sequences are used, the channel estimator 405 is expanded to include a second set of despreaders, accumulators, symbol summers, and filters. The first set would generate first channel estimates for the first known channel using a first PN code sequence; the second set would generate second channel estimates for the second known channel using a second PN code sequence. Likewise, the pilot regenerator 415 is expanded to include a second set of spreaders. The first set would spread the first channel estimates; the second set would spread the second channel estimates. The summer 425 would sum together all the outputs of the first and second sets of spreaders. Finally, the signal 437 is generated by summing together a first output of a first multiplier multiplying the delayed first PN code sequence with symbols associated with the first known channel and a second output of a second multiplier multiplying the delayed second PN code sequence with symbols associated with the second known channel. It will be further appreciated by persons of ordinary skill in the art, that alternative or multiple known downlink channels can be also be readily utilized with transmit and receive diversity.

Figure 9:
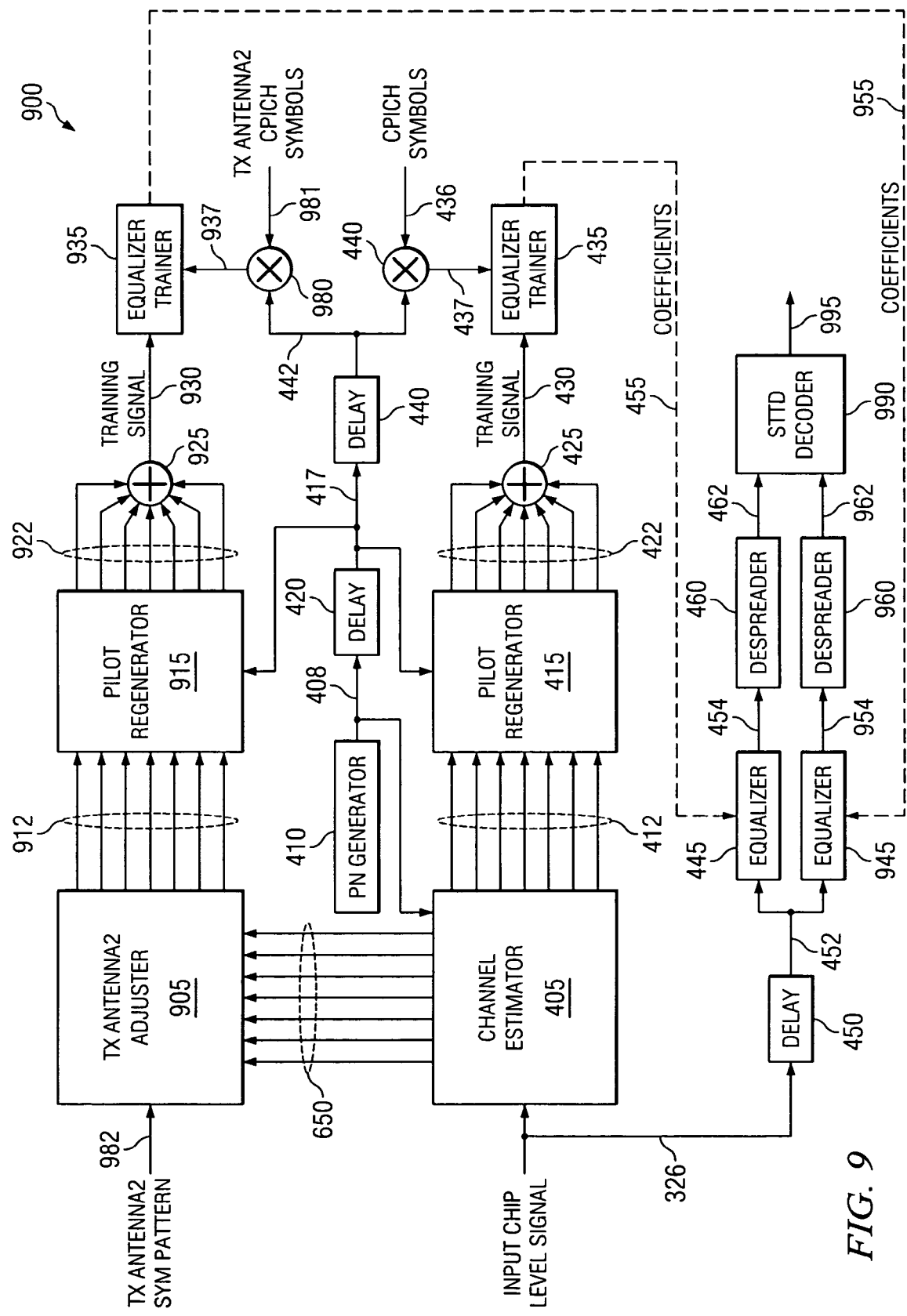
FIG. 9 is a block diagram illustration of a portion of a disclosed example digital baseband receiver, in which a wireless base station implements space time transmit diversity (STTD).

FIG. 9 is a block diagram illustrating a portion of a disclosed example digital baseband receiver 900 communicating with the wireless base station 110 implementing space time transmit diversity (STTD). To receive signals from a second transmit antenna (not shown) at the wireless base station 110, the example digital baseband receiver 900 provides a second pilot regenerator 915 generating a second plurality of spread channel estimates 922, a second summer 925 providing a second equalizer training signal 930, a second equalizer trainer 935 adapting a second set of equalizer coefficients 955, a second equalizer 945 applying a filter (whose coefficients are substantially equivalent to the second set of equalizer coefficients 955) to the delayed input chip level signal 452, and a second despreader 960 despreading an output 954 of the second equalizer 945. The signals received, processed and generated by these additional blocks are associated with signals and symbols transmitted by the second transmit antenna. The implementations of, and relationships between, the second pilot regenerator 915, the second summer 925, the second equalizer trainer 935, the second equalizer 945, and the second despreader 960 are as discussed above in relation to FIGS. 4, and 6-8.

In the wireless base station, second symbols to be transmitted by the second antenna are formed by multiplying a TX antenna2 symbol pattern 982 by first symbols to be transmitted by the first antenna. For example, if CPICH symbols 436 (i.e., first symbols) for the first transmit antenna are identical, then CPICH symbols 981 (i.e., second symbols) transmitted by the second transmit antenna are the TX antenna2 symbol pattern 982 scaled and rotated by the CPICH symbol 436. To extract the portion of the input chip level signal 326 associated with the second transmit antenna and to generate channel estimates 912 associated with the second transmit antenna, the receiver 900 provides a TX antenna2 adjuster 905. The TX antenna2 adjuster 905 multiplies each of the despread pilot channel symbols 650 (provided by the channel estimator 405 as discussed above in relation to FIG. 6) with the TX antenna2 symbol pattern 982 (known a priori to the receiver 900).

To adapt the equalizer coefficients 955 based on the second CPICH symbols 981 received from the second transmit antenna, the further delayed PN code sequence 442 is modified so as to be representative of the second CPICH symbols 981. To modify the further delayed PN code sequence 442, the example receiver 900 provides a multiplier 980. The multiplier 980 multiples the further delayed PN code sequence 442 with the second CPICH symbols 981 to generate a second locally generated pilot signal 937 used by the equalizer trainer 935 to adapt the second set of equalizer coefficients 955. Since the duration of each second CPICH symbol 981 is multiple (e.g., 256) chips, the multiplication of second CPICH symbol 981 and the further delayed PN code sequence 442 multiplies each second CPICH symbol 981 by N chips of the further delayed PN code sequence 442, where N is the duration of each second CPICH symbol 981.

The second training signal 930 substantially comprises a summation of the second CPICH symbols 981 convolved with the channel estimate 912 for each multipath further spread by the PN code sequence 408. Further, the locally generated pilot signal 937 (which includes the multiplication with second CPICH symbols 981) comprises the second CPICH symbols 981 spread by the PN code sequence 408. In this configuration, the equalizer trainer 935 will properly adapt coefficients 955 to equalize the multipath channel responses associated with the second transmit antenna.

To combine the equalized and despread signals 462 and 962 received from the two transmit antennas (i.e., the output of despreaders 460 and 960), the example receiver 900 provides a STTD decoder 990. As is well known to persons of ordinary skill in the art, the STTD decoder 990 buffers two symbols at a time from each of the signals 462 and 962 and combines them to form two symbols 995 that are provided to remaining portions (not shown) of a wireless receiver for further processing.

FIG. 10 is an illustration of a disclosed example manner of implementing the TX antenna2 adjuster 905 of FIG. 9. To generate channel estimates 912 associated with the second transmit antenna (not shown) of the wireless base station 110 (not shown), the TX antenna2 adjuster 905 provides a plurality of multipliers 1005, 1006, and 1007. In the illustrated manner, the multipliers 1005, 1006, and 1007 multiply each of despread pilot channel symbols 650 (provided by the channel estimator 405 as discussed above in relation to FIGS. 6 and 9) with the TX antenna2 symbol pattern 982.

As discussed above, the first CPICH symbols 436 transmitted by the first transmit antenna are orthogonal to the second CPICH symbols 981 transmitted by the second transmit antenna only when despread and accumulated over 512 chips. Because the chip accumulators 615, 616, and 617 of FIG. 6 each accumulated 256 chips, the TX antenna2 adjuster 905 provides a plurality of symbol summers 1010, 1011, and 1012. In the illustrated example, each symbol summer 1010, 1011, and 1012 determines a sum over two symbols. Thus, effectively implementing despreading over 512 chips. It should be readily apparent to persons of ordinary skill in the art that the number of chips accumulated by the chip accumulators 615, 616, and 617 and the number of symbols summed by the symbols summers 1010, 1011, and 1012 can be modified from the illustrated example as long as the chosen values ensure orthogonality of the CPICH symbols 436 and 981 transmitted by both transmit antenna of the wireless base station.

To obtain reliable channel estimates 912 for each multipath associated with the second transmit antenna of the wireless base station, the TX antenna2 adjuster 905 further provides a plurality of filters 1020, 1021, and 1022. In the illustrated example, the plurality of filters 1020, 1021, and 1022 are implemented as IIR filters and provide a low-pass filtering transfer function. The low-pass filtering transfer function serves to reduce out-of-band noise and to help smooth the channel estimates. It should be readily apparent to persons of ordinary skill in the art that the filters 1020, 1021, and 1022 could utilize FIR filters or other suitable filter structures or filtering arrangements.

Figure 11:
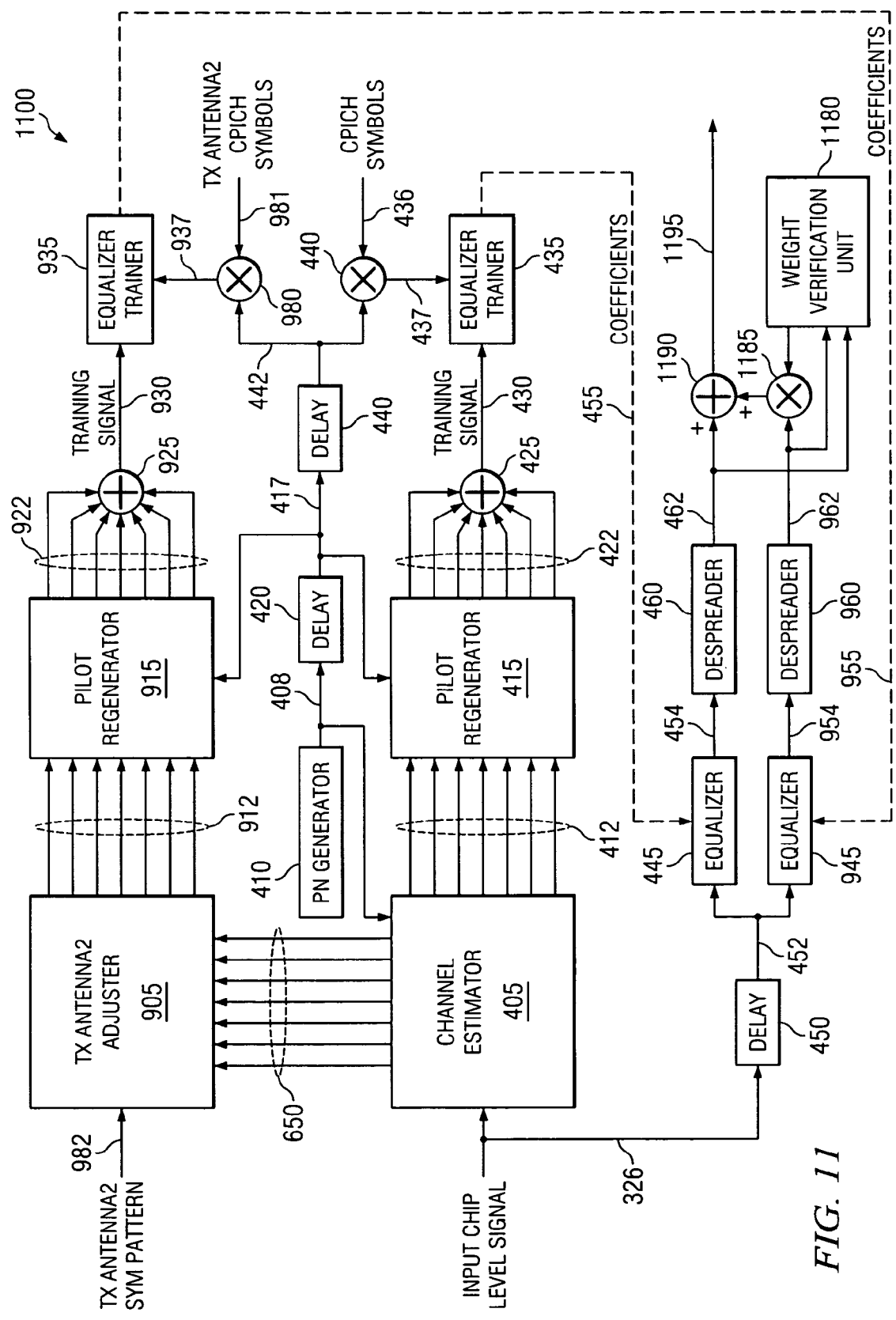
FIG. 11 is a block diagram illustration of a portion of a disclosed example digital baseband receiver, in which a wireless base station implements closed loop transmit diversity (CLTD).

FIG. 11 is a block diagram illustrating a portion of a disclosed example digital baseband receiver 1100 communicating with the wireless base station 110 implementing closed loop transmit diversity (CLTD). The implementation of the illustrated example of FIG. 11 is substantially the same as the illustrated example of FIG. 9. The difference between the illustrated examples of FIGS. 9 and 11 is that different receive processing is applied following the despreaders 460 and 960. As is well known to persons of ordinary skill in the art, the receiver 1100 is provided with a summer 1190 to combine the two equalized and despread signals 462 and 962. Further, to allow the example receiver 1100 to combine the two equalized and despread signals 462 and 962 in a substantially optimal fashion, the receiver 1100 provides a multiplier 1185 and a weight verification unit 1180. The weight verification unit 1180 performs antenna verification to determine a substantially optimum weighting of the two equalized and despread signals 462 and 962. To balance the contribution of each of the equalized and despread signals 462 and 962, the multiplier 1185 multiplies the output 962 of the second despreader 960 by the output of the weight verification unit 1180. The output of the multiplier 1185 is then summed with the output 462 of the first despreader 460 to determine a substantially optimal received signal 1195. The substantially optimal received signal 1195 is provided to remaining portions (not shown) of a wireless receiver for further processing.

Figure 12:
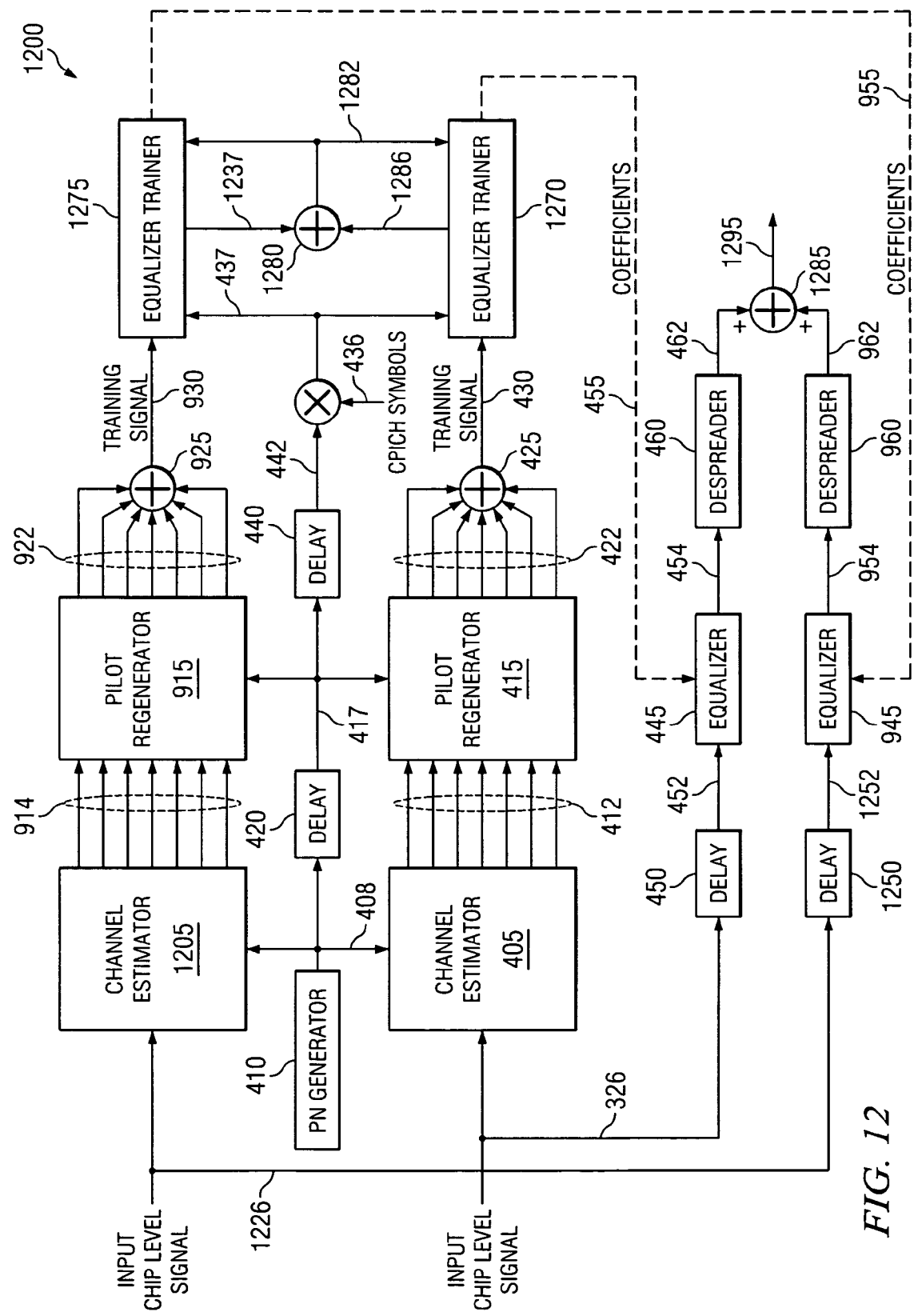
FIG. 12 is a block diagram illustration of a portion of a disclosed example digital baseband receiver using receiver diversity.

FIG. 12 is a block diagram illustrating a portion of a disclosed example digital baseband receiver 1200 using two antenna receive diversity. To process a second input chip level signal 1226 from a second receive antenna, the example digital baseband receiver 1200 provides a second channel estimator 1205 to generate a second plurality of channel estimates 914, a second pilot regenerator 915 generating a second plurality of scrambled channel estimates 922, a second summer 925 providing a second equalizer training signal 930, a second delay 1250, a second equalizer 945 applying a filter (utilizing a second set of equalizer coefficients 955) to a second delayed input chip level signal 1252, and a second despreader 960 despreading the output 954 of the second equalizer 945. The signals received, processed and generated by these additional blocks will be associated with the second input chip level signal 1226 received by the second receive antenna. The implementations of, and relationships between, the second channel estimator 1205, the second pilot regenerator 915, the second summer 925, the second delay 1250, the second equalizer 945, and the second despreader 960 are as discussed above in relation to FIGS. 4, and 6-8.

To adapt equalizer coefficients, the example receiver 1200 further includes equalizer trainers 1270 and 1275 adapting the first and the second sets of equalizer coefficients 455 and 955. To adapt the first equalizer coefficients 455 the first equalizer trainer 1270 applies a filter (whose coefficients are substantially equivalent to the current first equalizer coefficients 455) to the training signal 430 (i.e., the multipath pilot signal determined based on the input chip level signal 326 associated with the first receive antenna) to form a first equalized multipath pilot signal. The equalizer trainer 1270 adapts the coefficients of the filter to minimize an error between (a) the locally generated pilot training signal 437 and (b) a sum 1282 of the first equalized multipath pilot signal and a second equalized multipath pilot signal (determined by the second equalizer trainer 1275). In a similar fashion the second equalizer 1270 adapts the second equalizer coefficients 955 based on the locally generated pilot training signal 437.

In the illustrated example the filters of the equalizer trainers 1270 and 1275 are FIR filters. Further, the adaptation of the coefficients uses NLMS. Persons of ordinary skill in the art will readily appreciate that: the filters could be implementing using some other suitable filter structures or filtering arrangements; and/or other forms of coefficient adaptation (e.g., LMS, RLS, etc.) could be implemented.

To combine the equalized and despread signals 462 and 962 received from the two receive antennas, the example receiver 1200 provides a summer 1285. As is well known to persons of ordinary skill in the art, the summer 1285 combines the equalized and despread signals 462 and 962 to form a signal 1295 provided to remaining portions (not shown) of a wireless receiver for further processing.

FIG. 13 is an illustration of a disclosed example manner of implementing the equalizer trainer 1270 of FIG. 12. To create the signal 1282 which substantially matches a locally generated pilot signal 437, the equalizer trainer 1270 provides a filter 805. To form an error signal 1315 useful for adapting the coefficients of the filter 805, the equalizer trainer 1270 further provides a summer 1310. In the illustrated example, the summer 1310 computes the error signal 1315 as a difference between (a) a locally generated pilot signal 437 and (b) the sum 1282 of an output 1237 of the filter 805 and a second signal 1286. Further, the filter 805 is an FIR filter and adaptation of the coefficients of the filter 805 uses NLMS. However, persons of ordinary skill in the art will readily appreciate that the filter 805 could utilize some other suitable filter structure or filtering arrangement; and/or other forms of coefficient adaptation (e.g., LMS, RLS, etc.) could be implemented. It will be readily appreciated by persons of ordinary skill in the art, that equalizer trainer 1275 is also implemented in the example manner of FIG. 12.

Persons of ordinary skill in the art will readily appreciate that a digital baseband receiver using receive diversity receiving signals from the wireless base station 110 using transmit diversity is readily constructed using appropriate combinations of the example implementations discussed above. For example, if the wireless base station is implementing STTD an example implementation digital baseband receiver would be a combination of FIGS. 9 and 12. In particular: four equalizer trainers are needed (2 for transmit and 2 for receive); filter outputs (from two equalizer trainers associated with each transmit antenna) are combined to form a common error signal (as discussed in connection with FIGS. 12-13); an equalized/despread output for each transmit antenna is obtained by summing corresponding outputs from each receive antenna. For the case of STTD, two successive symbols are input to an STTD decoder. For the CLTD case, equalized/despread outputs corresponding to the second transmit antenna (after summing across receive antennas) are multiplied by a complex antenna verified weights and then summed with equalized/despread outputs corresponding to the first transmit antenna. Alternatively, to limit the complexity of the receiver, one may choose to do either transmit or receive diversity but not both simultaneously and, thus, have only two effective equalizers in the receiver.

Persons of ordinary skill in the art will also appreciate that a single computing device or processor may be utilized to implement a plurality of functions. For example, when transmit and receive diversity are both present, as discussed above, four equalizers are needed. However, they may not necessarily be implemented as four physical equalizers, but could alternatively, be implemented as two equalizers at twice the clock speed. Further, to limit the complexity of a wireless receiver, the wireless receiver may implement only transmit diversity techniques (e.g., FIGS. 9 and 11), receive diversity techniques (e.g., FIG. 12), or neither (e.g. FIG. 4).

Figure 14:
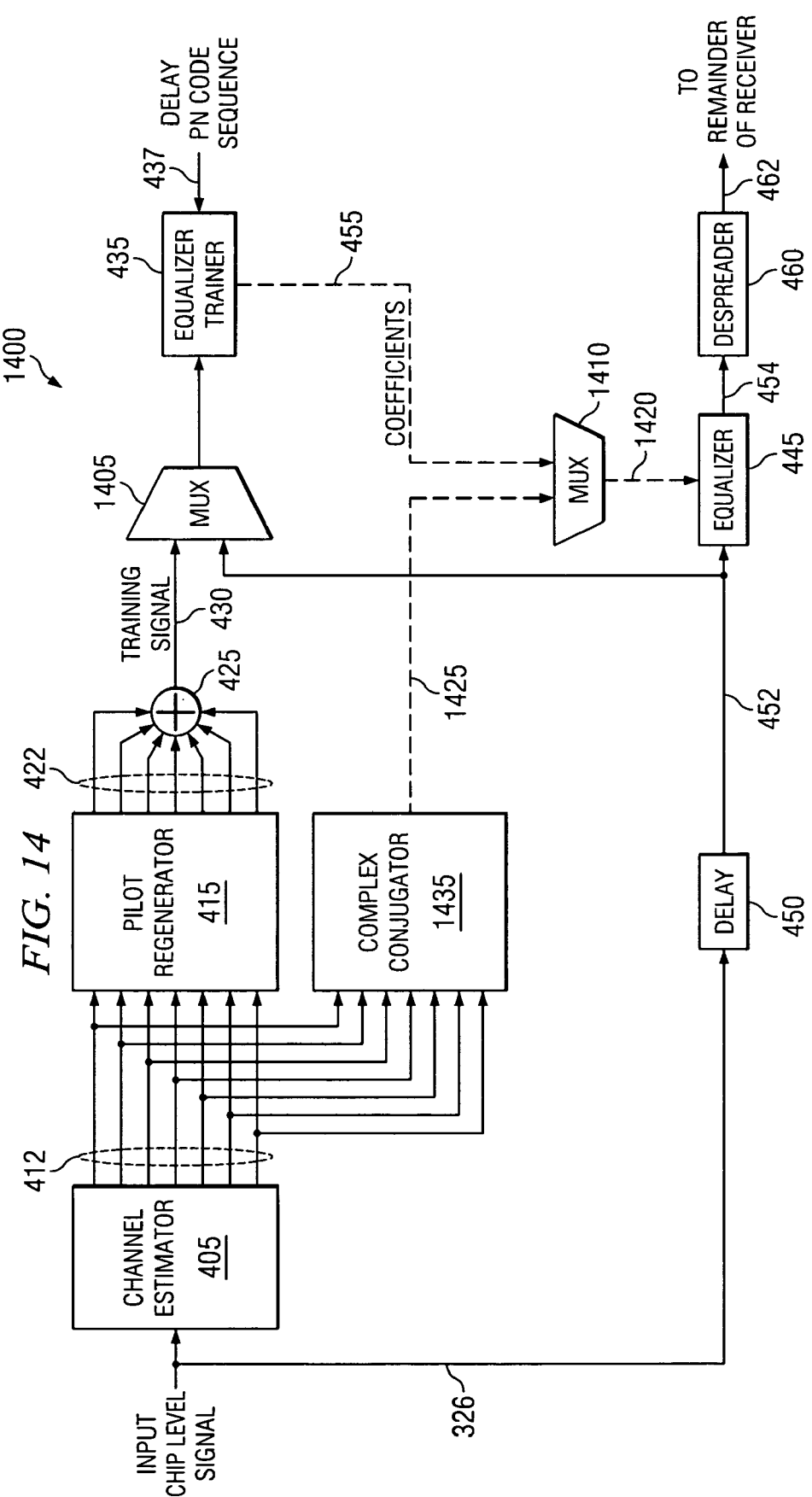
FIG. 14 is a block diagram illustration of a portion of a disclosed example digital baseband receiver, in which the receiver is configurable to implement improved equalizer training, conventional equalizer training, or a RAKE receiver.

FIG. 14 is a block diagram illustrating a portion of a disclosed example digital baseband receiver 1400 configurable to implement: (a) improved equalizer training (as discussed above), (b) conventional CPICH based NLMS, or (c) a RAKE receiver. To support all three implementations, the example digital baseband receiver 1400 implements two multiplexers 1405 and 1410. The first multiplexer 1405 selects whether the equalizer trainer 435 uses (a) the training signal 430 (i.e., multipath pilot signal) or (b) the delayed input chip level signal 452. The second multiplexer 1410 selects whether the equalizer coefficients 1420 are substantially equivalent to (a) complex conjugates 1425 of channel estimates 412 or (b) the coefficients 455 generated by the equalizer trainer 435. To form the complex conjugates 1425 of the channel estimates 412, the receiver 1400 provides a complex conjugator 1435. The complex conjugator 1435 forms complex conjugates 1425 as a complex conjugate of each channel estimate 412.

It should be readily apparent to persons of ordinary skill in the art that the receiver 1400 could eliminate either of the multiplexers if only two of the three receiver architectures are implemented.

Figure 15A:
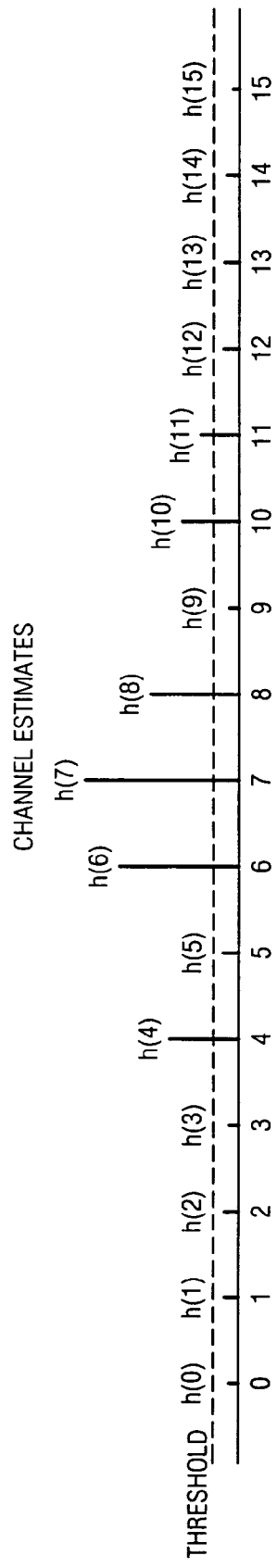
FIGS. 15a-c illustrate the relationship between channel estimates and finite impulse response (FIR) filter coefficients in a RAKE receiver.
Figure 15B:
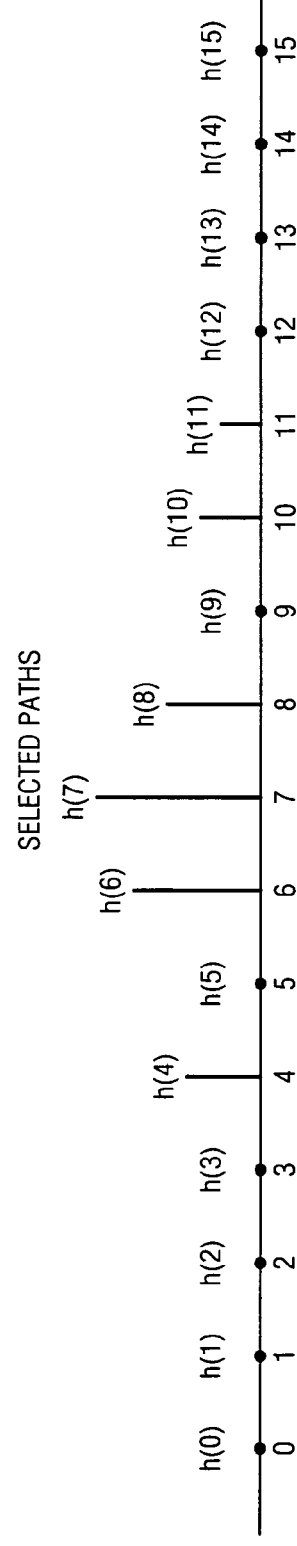
Figure 15C:
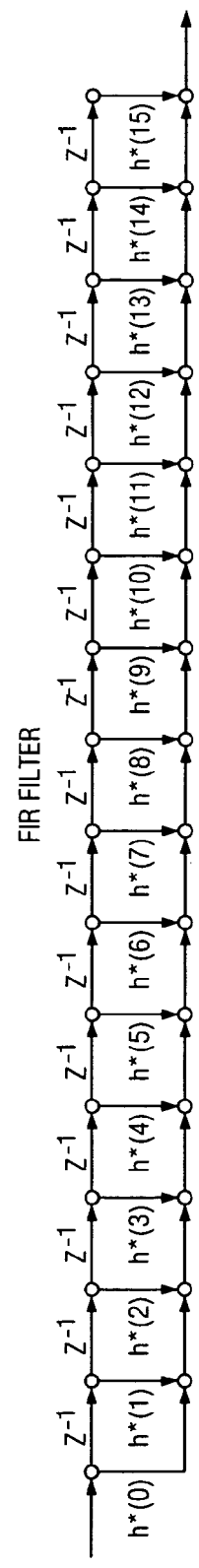

A Rake receiver can be realized by directly using the complex conjugates 1425 of the channel estimates 412 as filter coefficients 1420 for the equalizer 445. In the illustrated example, the equalizer 445 is an FIR filter, and the $t_K^{th}$ coefficient 1420 of the filter of the equalizer 445 is substantially equal to the channel estimate 412 corresponding to a multipath delay of $t_K$ (see FIG. 6), where K is an index taking on values between 1 and n where n is the number of multipaths processed by channel estimator 405. Zero values are assigned for equalizer coefficients 1420 corresponding to non-existing multipaths. Because each tap of the filter of the equalizer 445 (i.e., input data flowing through the filter) holds a delayed input data sample which is multiplied by the complex conjugate 1425 of the channel estimate 412 of corresponding multipath, an output 454 of the equalizer 445 is a sum of phase corrected samples at multipath positions. Thus the filter of the equalizer 445 implements processing substantially equivalent to performing maximal ratio combining at a chip level. In the illustrated example, if not all multipath information is available, channel estimates 412 corresponding to available coefficients 1420 of the filter of the equalizer 445 are computed. Then paths with high energy are chosen based on the amplitude of the channel estimates 412. In the illustrated example: if the amplitude of the channel estimate 412 is larger than a threshold, set the corresponding coefficient 1420 substantial equal to the complex conjugate of the channel estimate 412; otherwise set the corresponding coefficient 1420 to zero. FIGS. 15a-c illustrates an example of a 16-tap FIR filter case. In the example of FIGS. 15a-c, selected multipaths by a threshold are with delays at 4, 6, 7, 8, 10, and 11. The channel estimates h(4), h(6), h(7), h(8), h(10), and h(11) at these paths provide the filter coefficients h*(4), h*(6), h*(7), h*(8), h*(10), and h*(11) accordingly. Other coefficients are set to zero.

The illustrated example of FIG. 14 can be configured to support a Rake receiver by setting the multiplexer 1410 to select the complex conjugates 1425 (the setting of multiplexer 1405 can be ignored). It can further be configured to support a traditional CPICH based NLMS by setting the multiplexer 1405 to select the delayed input chip level signal 452 and the multiplexer 1410 to select the coefficients 455. Further, by setting the multiplexer 1405 to select the training signal 430 and the multiplexer 1410 to select the coefficients 455, the improved equalizer training discussed above is implemented. In the illustrated example, when one of the multiplexers 1405, 1410 is set so that the output of the complex conjugator 1435, the pilot regenerator 415, the summer 425, the multiplexer 1405, and/or the equalizer trainer 435 are ignored it is bypassed or disabled to reduce power consumption.

In the illustrated example, the first and second multiplexers 1405 and 1410 are controlled by a processor (not shown). For example, the processor controls the first and second multiplexers 1405 and 1410 to maximize the performance of the wireless receiver. For example, the processor could choose a RAKE receiver for low SNR, high Doppler, and strong line of sight conditions, and choose the improved equalizer training (as discussed above) otherwise. The processor may also control the first and second multiplexers 1405 and 1410 based on user input, wireless base station operator input, or any other suitable criteria.

As is well appreciated by persons of ordinary skill in the art, the example of FIG. 14 can be readily extended (using the teachings of FIGS. 9-13) to support wireless base station transmit diversity and receive diversity for (a) improved equalizer training (as discussed above), (b) conventional CPICH based NLMS, or (c) a RAKE receiver.

A flowchart representative of example machine readable instructions that may be executed by the example digital baseband receiver 400 of FIG. 4 is shown in FIG. 16. In this example, the machine readable instructions comprise a program for execution by a processor such as a digital signal processing (DSP) core 1710 shown in an example digital signal processor 1700 discussed below in connection with FIG. 17. The program may be embodied in coded instructions stored on a tangible medium such as a CD-ROM, a floppy disk, a hard drive, a digital versatile disk (DVD), or a memory associated with the processor 1710, but persons of ordinary skill in the art will readily appreciate that the entire program and/or parts thereof could alternatively be executed by a device other than the processor 1710 and/or embodied in firmware or dedicated hardware in a well known manner. For example, any or all of the channel estimator 405, the pilot regenerator 415, the summer 425, the equalizer trainer 435, the PN generator 410, the delays 420,440,450, the equalizer 445, and/or the despreader 460 could be implemented by software, hardware, and/or firmware. Further, although the example program is described with reference to the flowchart illustrated in FIG. 16, persons of ordinary skill in the art will readily appreciate that many other methods of implementing the example digital baseband receiver 400 of FIG. 4 may be used. For example, the order of execution of the blocks may be changed, and/or some of the blocks described may be changed, eliminated, or combined.

The program of FIG. 16 begins at block 1605 where the digital baseband processor 225 sets, configures and initializes the analog baseband processor 220 and the RF transceiver 215. The digital baseband processor 225 detects the signal level associated with received multipaths (block 1610). The digital baseband processor 225 next determines the timings associated with the received multipaths (block 1615) and sets the receiver mode (e.g., RAKE, improved equalizer training discussed above, etc.) (block 1617). Next, the channel estimator 405 despreads the input chip level signal 326 (block 1620) and determines channel estimates 412 (block 1625). Using the outputs 412 of the channel estimator 405, the pilot regenerator 1630 and the summer 425 determine the training signal 430 (i.e., multipath pilot signal) (block 1630). The equalizer trainer 435 adapts the coefficients 455 based upon the training signal 430 (block 1635). Using the adapted coefficients 455, the equalizer 445 equalizes the delay input chip level signal 452 (block 1640). Finally, the despreader 460 despreads the equalized receive signal 454 and the remainder of the receiver processing is applied (block 1645). As receiving of the input chip level signal 326 continues, the process comprised of block 1620-1645 is repeated.

FIG. 17 is a block diagram of an example digital signal processor (DSP) 1700 capable of implementing the apparatus and methods disclosed herein. For example, the DSP 1700 can be implemented by one or more digital signal processors from Texas Instruments. Of course, other digital signal processors from other manufacturers are also appropriate.

The DSP 1700 of the instant example includes the DSP core 1710. The DSP core 1710 is a general purpose programmable processor with enhancements making it more suitable for real-time processing of digital signals. The DSP core 1710 executes coded instructions present in main memory of the DSP 1700. The DSP core 1710 may implement, among other things, the equalizer trainer 435 and/or the equalizer 445.

The DSP core 1710 is in communication with the main memory including a read only memory (ROM) 1720 and a random access memory (RAM) 1725 via a bus 1705. The RAM 1725 may be implemented by Synchronous Dynamic Random Access Memory (SDRAM), Dynamic Random Access Memory (DRAM), RAMBUS Dynamic Random Access Memory (RDRAM) and/or any other type of random access memory device. The ROM 1720 may be implemented by flash memory and/or any other desired type of memory device. Access to the main memory 1720, 1725 is typically controlled by a memory controller (not shown) in a conventional manner. The RAM 1725 may implement, among other things, the delays 420, 440, and 450.

To reduce the computational burden of the DSP core 1710, the DSP 1700 provides an accelerator 1715. The accelerator 1715 contains dedicated circuits and hardware to implement specific data manipulation and/or signal processing. The accelerator 1715 may implement, among other things, the channel estimator 405, the pilot regenerator 415, the summer 425, and/or the despreader 460.

The DSP 1700 also includes a conventional interface circuit 1730. The interface circuit 1730 may be implemented by any type of well known interface standard, such as an external memory interface (EMIF), serial port, general purpose input/output, etc.

One or more input devices 1735 are connected to the interface circuit 1730. The input device(s) 1735 (e.g., analog to digital converters, data buffers, external memory, etc.) may be used to provide the DSP core 1710 input data and signals to be processed.

One or more output devices 1740 are also connected to the interface circuit 1730. The output devices 1740 (e.g., digital to analog converters, data buffers, external memory, etc.) may be used by the DSP core 1710 to provide processed output data and signal to external devices.

From the foregoing, persons of ordinary skill in the art will appreciate that the above disclosed methods and apparatus may be realized within a single device or across two cooperating devices, and could be implemented by software, hardware, and/or firmware to implement the improved wireless receiver disclosed herein.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method of equalizer training in a wireless receiver comprising:

receiving a signal containing first portions that are based on known data and second portions that are based on unknown data;

generating a training signal based on the received signal, by:

despreading the receive signal using a pseudo noise code sequence associated with a common pilot channel;

applying accumulators to the despread received signal to generate accumulator outputs;

spreading accumulator outputs with the pseudo noise code sequence associated with the common pilot channel; and summing together spread accumulator outputs;

adapting filter coefficients using the training signal; and applying a first filter that is using filter coefficients substantially equal to the adapted filter coefficients to operate on the received signal.

2. A method as defined in claim 1, wherein adapting the filter coefficients using the training signal comprises:

applying a second filter to the training signal; and adapting coefficients of the second filter to minimize an error between the filtered training signal and a locally generated pilot signal.

3. A method as defined in claim 2, further comprising:

generating a second training signal based on the received signal, wherein the second training signal consists essentially of one or more of the first portions associated with an additional transmit antenna;

adapting second filter coefficients using the second training signal; and applying a third filter that is using filter coefficients substantially equal to the second adapted filter coefficients to operate on the received signal.

4. A method as defined in claim 3, wherein generating the second training signal based on the received signal comprises:

multiplying the accumulator outputs by a transmit symbol pattern associated with the additional transmit antenna;

spreading multiplication outputs with the pseudo noise code sequence associated with the common pilot channel; and summing together spread multiplication outputs.

5. A method as defined in claim 2, further comprising:

receiving a second signal containing third portions that are based on known data and fourth portions that are based on unknown data;

generating a second training signal based on the second received signal, wherein the second training signal consists essentially of one or more of the third portions;

adapting second filter coefficients using the second training signal; and applying a third filter that is using filter coefficients substantially equal to the second adapted filter coefficients to operate on the second received signal.

6. A method as defined in claim 5, wherein generating the second training signal based on the second received signal comprises:

despreading the second received signal using the pseudo noise code sequence associated with the common pilot channel;

accumulating the second despread receive signal to generate second accumulator outputs;

spreading second accumulator outputs with the pseudo noise code sequence associated with the common pilot channel; and summing together second spread accumulator outputs to generate the second training signal.

7. A method of equalizer training in a wireless receiver comprising:

receiving a signal containing first portions that are based on known data and second portions that are based on unknown data;

generating a training signal based on the received signal, wherein the training signal consists essentially of one or more of the first portions;

adapting filter coefficients using the training signal;

applying a first filter that is using filter coefficients substantially equal to the adapted filter coefficients to operate on the received signal, wherein the adapting the filter coefficients using the training signal comprises:

applying a second filter to the training signal; and adapting coefficients of the second filter to minimize an error between the filtered training signal and a locally generated reference signal.

8. A method of equalizer training in a wireless receiver comprising:

receiving a signal containing first portions that are based on known data and second portions that are based on unknown data;

generating a first training signal based on the received signal, wherein the first training signal consists essentially of one or more of the first portions;

adapting first filter coefficients using the training signal;

applying a first filter that is using filter coefficients substantially equal to the adapted first filter coefficients to operate on the received signal;

generating a second training signal based on the received signal, wherein the second training signal consists essentially of one or more of the first portions associated with an additional transmit antenna;

adapting second filter coefficients using the second training signal;

applying a second filter that is using filter coefficients substantially equal to the adapted second filter coefficients to operate on the received signal; and wherein generating the second training signal based on the received signal comprises:

despreading the receive signal using a pseudo noise code sequence associated with a common pilot channel;

applying accumulators to the despread receive signal to generate accumulator outputs;

multiplying the accumulator outputs by a transmit symbol pattern associated with the additional transmit antenna;

spreading multiplication outputs with the pseudo noise code sequence associated with the common pilot channel; and summing together spread multiplication outputs to generate the second training signal.

9. A method of equalizer training in a wireless receiver comprising:

receiving a first signal containing first portions that are based on known data and second portions that are based on unknown data;

generating a first training signal based on the received first signal, wherein the training signal consists essentially of one or more of the first portions;

adapting first filter coefficients using the first training signal;

applying a first filter that is using filter coefficients substantially equal to the adapted first filter coefficients to operate on the received first signal;

receiving a second signal containing third portions that are based on known data and fourth portions that are based on unknown data;

generating a second training signal based on the second received signal, wherein the second training signal consists essentially of one or more of the third portions;

adapting second filter coefficients using the second training signal;

applying a second filter that is using filter coefficients substantially equal to the second adapted filter coefficients to operate on the second received signal; and wherein generating the second training signal based on the second received signal comprises:

despreading the second received signal using a pseudo noise code sequence associated with a common pilot channel;

applying accumulators to the despread second received signal;

despreading the second despread received signal to generate accumulator outputs;

spreading the second accumulator outputs with the pseudo noise code sequence associated with the common pilot channel; and summing together second spread accumulator outputs to generate the second training signal.

10. A wireless receiver apparatus comprising:

a signal receiver to receive signals containing first portions that are based on known data and second portions that are based on unknown data;

a channel estimator to determine a first plurality of channel estimates based on one or more of the first portions;

a training signal generator to generate a training signal from the first plurality of channel estimates, wherein the training signal consists essentially of one or more of the first portions;

a filter adapter to adapt filter coefficients using one of the training signal or the received signals; and a filter that is using filter coefficients substantially equal to one of the adapted filter coefficients or complex conjugates of the channel estimates to operate on the received signals.

11. A wireless receiver apparatus as defined in claim 10, further comprising:

a second channel estimator to determine a second plurality of channel estimates based on one or more of the first portions associated with an additional transmit antenna;

a second training signal generator to generate a second training signal from the second plurality of channel estimates;

a second filter adapter to adapt second filter coefficients using one of the second training signal or the received signals; and a second filter that is using filter coefficients substantially equal to one of the second adapted filter coefficients or second complex conjugates of the second plurality of channel estimates to operate the received signals.

12. A wireless receiver apparatus as defined in claim 10, further comprising:

a second signal receiver to receive second signals containing third portions that are based on known data and fourth portions that are based on unknown data;

a second channel estimator to determine a second plurality of channel estimates based on one or more of the third portions;

a second training signal generator to generate a second training signal from the second plurality of channel estimates;

a second filter adapter to adapt second filter coefficients using one of the second training signal or the second received signals; and a second filter that is using filter coefficients substantially equal to one of the second adapted filter coefficients or second complex conjugates of the second plurality of channel estimates to operate on the second received signals.

13. A wireless receiver apparatus comprising:

a signal receiver to receive signals containing first portions that are based on known data and second portions that are based on unknown data;

a channel estimator to determine a first plurality of channel estimates based on one or more of the first portions;

a training signal generator to generate a training signal from the first plurality of channel estimates;

a filter adapter to adapt filter coefficients using one of the training signal or the received signals;

a filter that is using filter coefficients substantially equal to one of the adapted filter coefficients or complex conjugates of the channel estimates to operate on the received signals;

a first multiplexer to select whether the filter adapter operates on the training signal or the received signals; and a second multiplexer to select whether the filter uses the adapted filter coefficients or the complex conjugates of the channel estimates.

14. A wireless receiver apparatus as defined in claim 13, wherein the first and second multiplexers are controlled by a processor based on the performance of the wireless receiver.

15. A wireless receiver apparatus comprising:

a signal receiver to receive signals containing first portions that are based on known data and second portions that are based on unknown data;

a channel estimator to determine a first plurality of channel estimates based on one or more of the first portions;

a training signal generator to generate a training signal from the first plurality of channel estimates;

a filter adapter to adapt filter coefficients using one of the training signal or the received signal;

a filter that is using filter coefficients substantially equal to one of the adapted filter coefficients or complex conjugates of the channel estimates to operate on the received signals;

a selector to select the training signal or the received signals by a processor, and wherein the processor maximizes the performance of the wireless receiver.

* * * * *